United States Patent
Awasthi et al.

(10) Patent No.: US 10,282,100 B2
(45) Date of Patent: May 7, 2019

(54) DATA MANAGEMENT SCHEME IN VIRTUALIZED HYPERSCALE ENVIRONMENTS

(71) Applicants: Manu Awasthi, Milpitas, CA (US); Robert Brennan, Santa Clara, CA (US)

(72) Inventors: Manu Awasthi, Milpitas, CA (US); Robert Brennan, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 277 days.

(21) Appl. No.: 14/729,026

(22) Filed: Jun. 2, 2015

(65) Prior Publication Data
US 2016/0054922 A1 Feb. 25, 2016

Related U.S. Application Data

(63) Continuation-in-part of application No. 14/561,204, filed on Dec. 4, 2014.

(60) Provisional application No. 62/082,604, filed on Nov. 20, 2014, provisional application No. 62/039,415, filed on Aug. 19, 2014.

(51) Int. Cl.
G06F 3/06 (2006.01)
(52) U.S. Cl.
CPC ............ *G06F 3/061* (2013.01); *G06F 3/0631* (2013.01); *G06F 3/0685* (2013.01)
(58) Field of Classification Search
None
See application file for complete search history.

(56) References Cited

U.S. PATENT DOCUMENTS

| | | | |
|---|---|---|---|
| 5,392,244 A * | 2/1995 | Jacobson | ............ G06F 11/1076 711/114 |
| 8,554,963 B1 | 10/2013 | Shapiro et al. | |
| 8,738,860 B1 | 5/2014 | Griffin et al. | |
| 9,037,548 B1 | 5/2015 | Dolan et al. | |

(Continued)

FOREIGN PATENT DOCUMENTS

EP 1067461 B1 4/2013

OTHER PUBLICATIONS

Ravi Budruk, PCI Express Basic, Mind Share Inc, 2007.*
Microsoft dictioanrys, 2002, pp. 7250726.*
IEEE100 dictionary, Seventh edition, 2005, pp. 297, 624-625, 637, 797, 1123-1134.*
What IF.com dictionary, 2006.*

(Continued)

*Primary Examiner* — Tuan V Thai
(74) *Attorney, Agent, or Firm* — Renaissance IP Law Group LLP

(57) ABSTRACT

According to one general aspect, a memory management unit (MMU) may be configured to interface with a heterogeneous memory system that comprises a plurality of types of storage mediums. Each type of storage medium may be based upon a respective memory technology and may be associated with performance characteristic(s). The MMU may receive a data access for the heterogeneous memory system. The MMU may also determine at least one of the storage mediums of the heterogeneous memory system to service the data access. The target storage medium may be selected based upon at least one performance characteristic associated with the target storage medium and a quality of service tag that is associated with the virtual machine and that indicates one or more performance characteristics. The MMU may route the data access by the virtual machine to the at least one of the storage mediums.

29 Claims, 12 Drawing Sheets

(56) References Cited

U.S. PATENT DOCUMENTS

| | | | |
|---|---|---|---|
| 9,047,017 B1* | 6/2015 | Dolan | G06F 3/0653 |
| 2003/0079019 A1* | 4/2003 | Lolayekar | H04L 67/1097 |
| | | | 709/226 |
| 2003/0221033 A1* | 11/2003 | Kim | G06F 13/364 |
| | | | 710/113 |
| 2009/0313445 A1* | 12/2009 | Pandey | G06F 9/4856 |
| | | | 711/162 |
| 2010/0115172 A1 | 5/2010 | Gillingham et al. | |
| 2010/0125677 A1 | 5/2010 | Bouvier | |
| 2010/0153617 A1 | 6/2010 | Miroshnichenko et al. | |
| 2010/0325352 A1 | 12/2010 | Schuette et al. | |
| 2011/0188210 A1* | 8/2011 | Huang | H05K 1/14 |
| | | | 361/735 |
| 2012/0017043 A1 | 1/2012 | Aizman et al. | |
| 2012/0185846 A1* | 7/2012 | Recio | G06F 9/5077 |
| | | | 718/1 |
| 2012/0210069 A1 | 8/2012 | Bayer et al. | |
| 2013/0263125 A1* | 10/2013 | Shamsee | G06F 9/45558 |
| | | | 718/1 |
| 2014/0173232 A1* | 6/2014 | Reohr | G06F 3/0611 |
| | | | 711/162 |
| 2016/0011965 A1 | 1/2016 | Murphy et al. | |

OTHER PUBLICATIONS

Memory management unit, Wikipedia, 2014.*
IEEE100 dictionary, seven edition, defines commonly known terms, published by IEEE, 2000.*
SCSI by wikipedia, 2014.*
Examiner Answer, copending U.S. Appl. No. 14/561,204, 2018.*
Bathen et al., "VaMv: Variability-aware Memory Virtualization," Design, Automation & Test in Europe Conference & Exhibition, 2012, pp. 284-287 (4 pages), IEEE, 2012. (http://nanocad.ee.ucla.edu/pub/Main/Publications/BathenDNG12.pdf).
Marty et al., "Virtual Hierarchies," IEEE Micro 28, No. 1 (2008), pp. 99-109. (http://research.cs.wisc.edu/multifacet/papers/ieeemicro08_virtual hierarchies.pdf).
Microsoft Computer Dictionary, publish 2002.
Wikipedia, "Memory Hierarchy," downloaded from website (https://en.wikipedia.org/wiki/Memory_hierarchy) on Sep. 27, 2014, pp. 1-4.
Decision on Appeal for U.S. Appl. No. 14/561,204, dated Feb. 15, 2019.
Notice of Allowance for U.S. Appl. No. 14/561,204, dated Mar. 5, 2019.

* cited by examiner

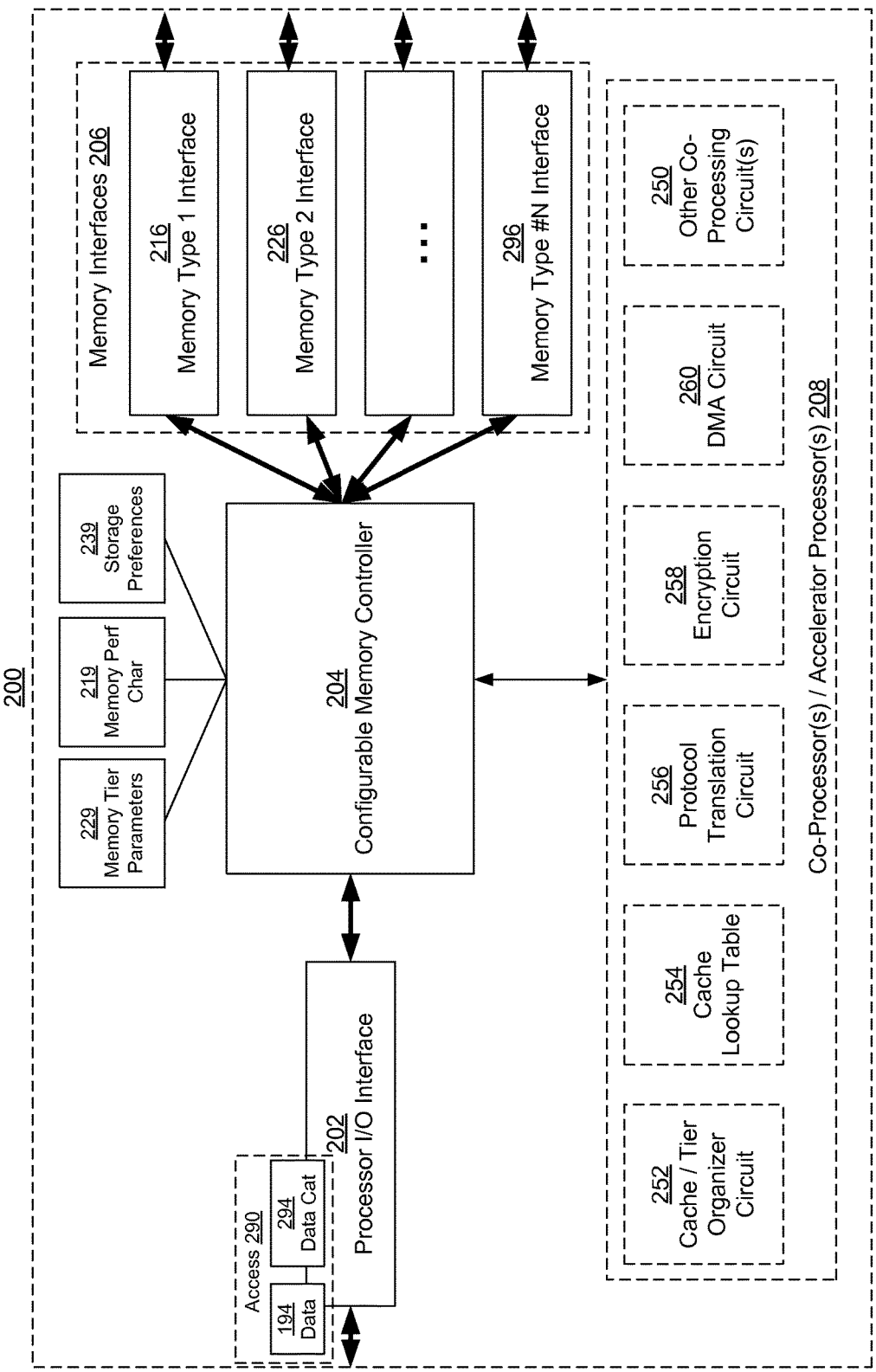

500

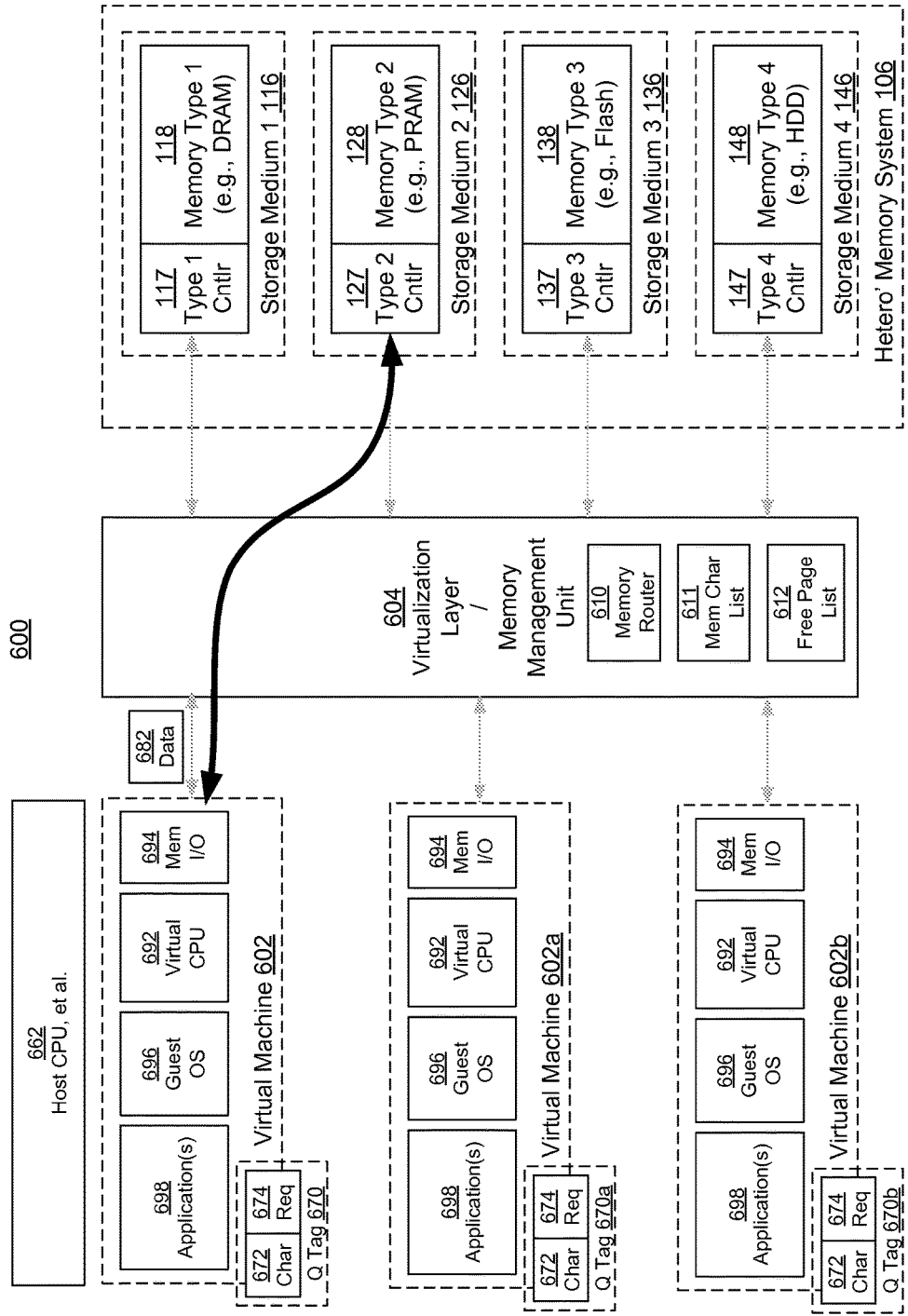

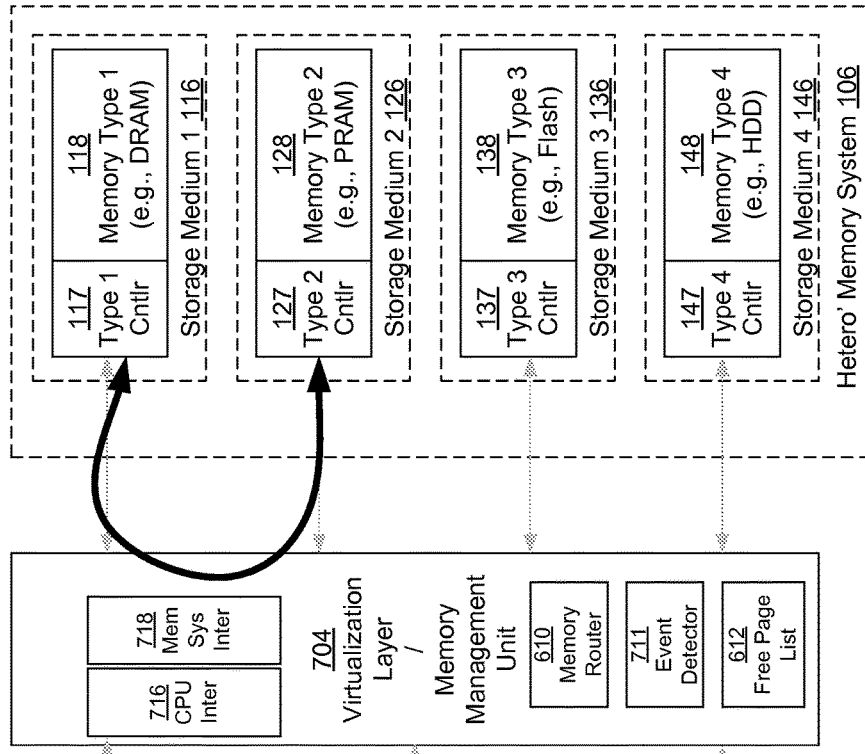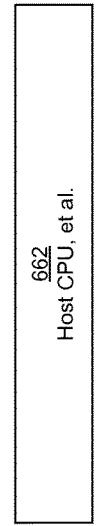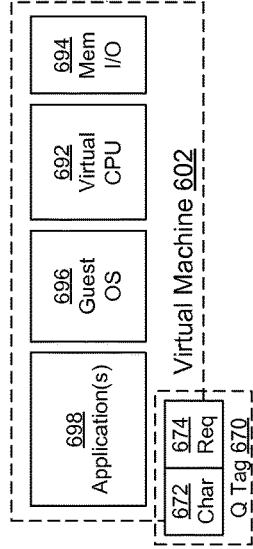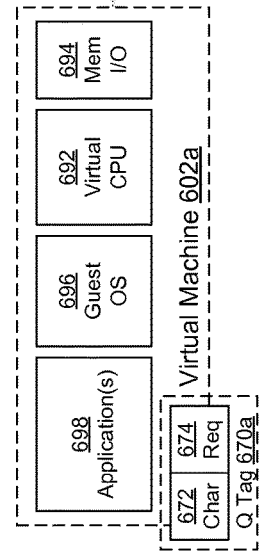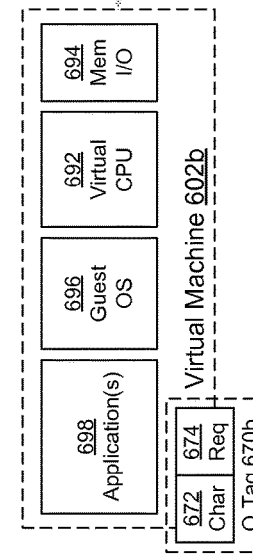
FIG. 7

800

DATA MANAGEMENT SCHEME IN VIRTUALIZED HYPERSCALE ENVIRONMENTS

CROSS-REFERENCE TO RELATED APPLICATIONS

This application is a continuation-in-part of, and claims priority under 35 U.S.C. § 120 to, application Ser. No. 14/561,204, filed on Dec. 4, 2014, entitled "UNIFIED ADDRESSING AND HIERARCHICAL HETEROGENEOUS STORAGE AND MEMORY", which in turn claims the priority benefit, under 35 U.S.C. § 119, of U.S. Provisional Application Ser. No. 62/039,415, entitled "MECHANISM FOR MULTIPROCESSOR OPERATION USING UNIFIED ADDRESSING AND HIERARCHICAL HETEROGENEOUS STORE/MEMORY" filed on Aug. 19, 2014. The subject matter of these earlier filed applications are hereby incorporated by reference.

This application claims priority under 35 U.S.C. § 119 to Provisional Patent Application Ser. No. 62/082,604, entitled "DATA MANAGEMENT SCHEME IN VIRTUALIZED HYPERSCALE ENVIRONMENTS" filed on Nov. 20, 2014. The subject matter of this earlier filed application is hereby incorporated by reference.

TECHNICAL FIELD

This description relates to data storage, and more specifically to the storage of data within a heterogeneous memory system.

BACKGROUND

The term memory hierarchy is often used in computer architecture when discussing performance issues in computer architectural design. Traditionally, a "memory hierarchy", in a computer storage context, distinguishes each level in the "hierarchy" by response time. Since response time, complexity, and capacity are generally related, the levels may also be distinguished by the controlling technology (e.g., transistor storage, electrically erasable programmable read-only memory, magnetic storage, optical storage, etc.).

Traditionally, a computing device has had several generalized levels within the memory hierarchy. The first and fastest level is the processor's registers and instruction/data cache close to execution units (traditionally comprised of static random access memory (SRAM)). The second and next fastest level may be a unified instruction and data cache with a size much larger than the previous level of cache. This level is usually shared among one or more CPU and other execution or processing units such as Graphics Processing Unit (GPU), Digital Signal Processing (DSP), etc. Outside integrated circuits, some or all of the main or system memory which is traditionally comprised of dynamic RAM (DRAM), may be used as cache. The next level of the memory hierarchy is often very slow compared to the prior levels. It generally comprises magnetic or solid-state memory (e.g., a hard drive or NAND flash technology, etc.) and is known as "secondary storage". The next level is the slowest, and traditionally comprises large bulk medium (e.g., optical discs, tape back-ups, etc.).

SUMMARY

According to one general aspect, an apparatus may include a memory management unit. The memory management unit may be configured to interface with a heterogeneous memory system that comprises a plurality of types of storage mediums. Each type of storage medium may be based upon a respective memory technology and may be associated with one or more performance characteristics. The memory management unit may be configured to receive, from a virtual machine, a data access for the heterogeneous memory system. The memory management unit may also be configured to determine at least one of the storage mediums of the heterogeneous memory system to service the data access. The target storage medium may be selected based, at least in part, upon at least one performance characteristic associated with the target storage medium and a quality of service tag that is associated with the virtual machine and that indicates one or more performance characteristics. The memory management unit may be configured to route the data access by the virtual machine to the at least one of the storage mediums.

According to another general aspect, a method may include receiving, from a virtual machine that is executed by a processor, a data access for a heterogeneous memory system. The heterogeneous memory system may include a plurality of types of storage mediums, each type of storage medium based upon a respective memory technology and is associated with one or more performance characteristic. The method may also include determining, by a memory management unit, a target storage medium of the heterogeneous memory system for the data access based, at least in part, upon at least one performance characteristic associated with the target storage medium and a quality of service tag that is associated with the virtual machine and that indicates one or more performance characteristics guaranteed by the virtual machine. The method may further include routing, by the memory management unit, the data access, at least partially, between the processor and the target storage medium.

According to another general aspect, an apparatus may include a processing-side interface configured to receive a data access of a memory system. The apparatus may include a memory router configured to determine if the memory access targets a heterogeneous memory system that comprises a plurality of types of storage mediums, wherein each type of storage medium is based upon a respective memory technology and is associated with one or more performance characteristic, and, if the memory access targets a heterogeneous memory system, select a target storage medium of the heterogeneous memory system for the data access based, at least in part, upon at least one performance characteristic associated with the target storage medium and a quality of service tag that is associated with the data access and that indicates one or more performance characteristics. The apparatus may further include a heterogeneous memory system interface configured to, if the memory access targets a heterogeneous memory system, route the data access, at least partially, to the target storage medium.

The details of one or more implementations are set forth in the accompanying drawings and the description below. Other features will be apparent from the description and drawings, and from the claims.

A system and/or method for to data storage, and more specifically to the storage of data within a heterogeneous memory system, substantially as shown in and/or described in connection with at least one of the figures, as set forth more completely in the claims.

BRIEF DESCRIPTION OF THE DRAWINGS

FIG. 2 is a block diagram of an example embodiment of an apparatus in accordance with the disclosed subject matter.

FIG. 6a is a block diagram of an example embodiment of a system in accordance with the disclosed subject matter.

FIG. 7 is a block diagram of an example embodiment of a system in accordance with the disclosed subject matter.

Like reference symbols in the various drawings indicate like elements.

DETAILED DESCRIPTION

Figure 1:
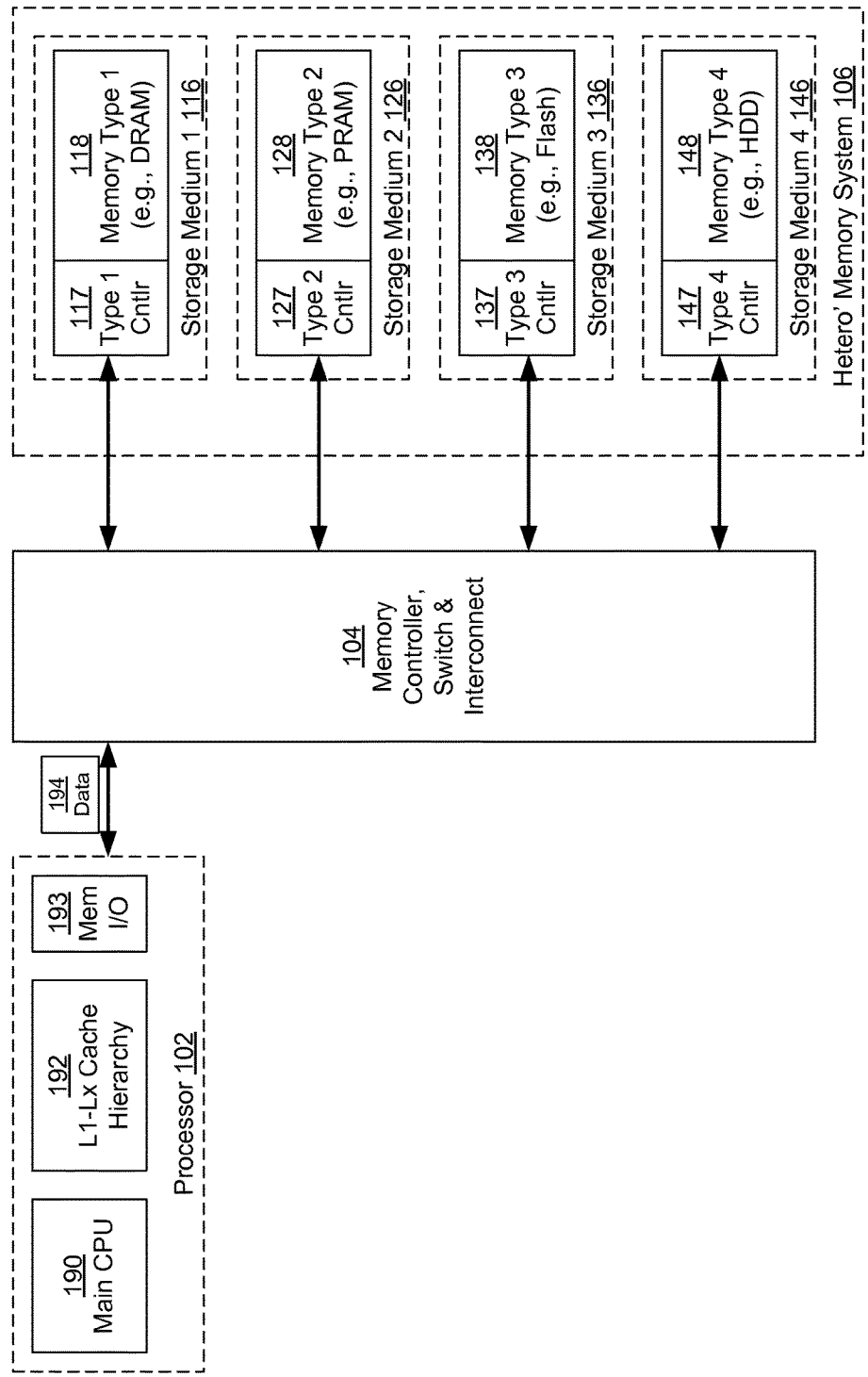
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, a mechanism to organize and operate a computing system with a variety of memory and/or storage technologies (e.g. DRAM, NAND, Hard disk, etc.) is shown.

In various embodiments, the system 100 may include a processor 102, a memory controller, switch or interconnect 104, and a heterogeneous memory system 106. In various embodiments, the heterogeneous memory system 106 may include a plurality of different storage mediums (e.g., storage mediums 116, 126, 136, 146, etc.). In such an embodiment, the heterogeneous memory system 106 may include different types of storage mediums based upon a variety of storage technologies. In some embodiments, these technologies may include, but are not limited to, for example, DRAM, Phase-change RAM (PRAM), NAND or flash memory (e.g., SSD, etc.), Resistive RAM (RRAM), Magnetoresistive RAM (MRAM), magnetic memory (e.g., a HDD, etc.), etc. It is understood that the above are merely a few illustrative examples to which the disclosed subject matter is not limited.

Each memory/storage technology may have different power, speed, throughput, capacity and/or cost characteristics. More generally, these characteristics may be referred to as "performance characteristics". Because of these different performance characteristics, storage mediums employing different memory technologies are traditionally segregated within the system. For example, fast but volatile memories (e.g., DRAM, etc.) are accessed by the processor 102 via a first protocol and a first chipset part or circuit (e.g., an integrated memory controller (MCH), a north bridge of a chipset, etc.). Conversely, slower but non-volatile memories (e.g., HDD, SSD, etc.) are accessed by the processor 102 via a second protocol and possibly a second chipset part or circuit (e.g., Input/Output (I/O) Controller Hub (ICH), a south bridge of a chipset, etc.). The use of specific protocols and dedicated circuits makes it difficult to change storage technologies within a system (e.g., due to changing needs, replacing one technology with another, etc.). In the illustrated embodiment, the heterogeneous memory system 106 and the memory interconnect 104 allow a variety of memory technologies to be employed within the same system 100.

In the illustrated embodiment, the system 100 includes a processor 102. The processor 102 in turn may include a main central processor unit (CPU) 190 or plurality of CPU cores. In various embodiments, the CPU 190 may be configured to execute software programs which in turn access and manipulate data (e.g., data 194, etc.). In some embodiments, the processor 102 may include a cache hierarchy 192 that forms the first level in the system 100's memory hierarchy. In various embodiments, the cache hierarchy 192 may include SRAM arranged in multiple levels (e.g., level 0 (L0), level 1 (L1), level 2 (L2), etc.).

When the processor 102 is unable to access the desired data 194 within the cache hierarchy 192, the processor 190 may attempt to access the data 194 (e.g., read the data, write to the data, etc.) via another layer of the memory hierarchy (e.g., within main memory, a hard disk drive, etc.). In the illustrated embodiment, the processor 102 may include a memory input/output (I/O) interface 190 configured to access one or more of the levels of the memory hierarchy that are external to the processor 102.

Further, in various embodiments, the processor 102 may include a memory input/output (I/O) interface 193 configured to communicate with memory. In the illustrated embodiment, this memory I/O interface 193 may be configured to communicate with the memory interconnect 104 and, via the memory interconnect 104, the heterogeneous memory system 106. It is understood that the above is merely one illustrative example to which the disclosed subject matter is not limited.

In the illustrated embodiment, the system 100 may include a memory interconnect 104. The memory interconnect 104 may be configured to route a data access from the processor 102 (e.g., a data write, a data read, etc.) to a target storage medium. In the illustrated embodiment, the target storage medium may be included within the heterogeneous memory system 106.

In some embodiments, the heterogeneous memory system 106 may include a plurality of different types of storage mediums. As a non-limiting example, the heterogeneous memory system 106 may include four different storage mediums (e.g., storage mediums 116, 126, 136, and 146, etc.), each based upon a different memory technology (e.g., DRAM, PRAM, Flash memory, magnetic memory, etc.) and having different performance characteristics (e.g., volatility, speed, a fast write speed, non-volatility, capacity, limited write cycles, etc.). It is understood that the above is merely one illustrative example to which the disclosed subject matter is not limited.

In such an embodiment, it may be desirable to store different pieces of data within different types of memory. As described above, the memory interconnect 104 may be configured to determine which storage medium should store or is storing the data 194 and route the data access from the processor to the desired storage medium. In various embodiments, the memory interconnect 104 may be configured to route the data access to a target or selected storage medium based, at least in part, upon one or more of the performance characteristics of the various storage mediums (e.g., storage mediums 116, 126, 136, and 146, etc.).

For example, a piece of data 194 that is accessed often or is considered temporary might be stored within a volatile but quick storage medium (e.g., the DRAM storage medium 116), whereas a piece of data 194 that is rarely accessed or is stored permanently (or semi-permanently) may be stored within a non-volatile storage medium (e.g., the HDD storage medium 146). It is understood that the above are merely a few illustrative examples to which the disclosed subject matter is not limited.

In various embodiments, the data 194 may be associated with a particular data category or performance indicator (shown in FIG. 2) that provides the memory interconnect 104 with a hint, address range or values, quality of service or instruction as to what type of storage medium or performance characteristics are important or associated with the particular piece of data 194. In various embodiments, each data category may be associated with one or more desirable or optimum memory or storage demands or preferences, such as, for example, access speed (e.g., read and/or write performance), persistence, storage energy efficiency, access size, etc.

For example, if the data 194 is marked or associated with a data category that indicates that the data 194 is temporary, the data 194 may be routed to the DRAM storage medium 116. In such an embodiment, the memory interconnect 104 may determine that the performance characteristics provided by DRAM storage medium 116 are a good (or the best possible) match for the associated data category. It is understood that the above is merely one illustrative example to which the disclosed subject matter is not limited.

In various embodiments, the memory interconnect 104 may be configured to preferentially route the data to one of the plurality of types of storage mediums based upon the data category. In some embodiments, multiple storage mediums may be acceptable for the data. In such an embodiment, the memory interconnect 104 may be configured to rank the acceptable storage mediums based upon one or more criteria (e.g., access speed, volatility, etc.) and then select a target storage medium based upon other factors (e.g., available capacity for storage, available bus bandwidth, available number of write ports, which storage medium is already storing the data, quality of service and reservation, etc.). It is understood that the above are merely a few illustrative examples to which the disclosed subject matter is not limited.

In some embodiments, the data category may be set dynamically by the processor 102 or a piece of software executed by the processor 102 (e.g., an application, an operating system, a device driver, etc.). In another embodiment, the data category may be set statically when the software was compiled or created or at run time based on operating system directions. In yet another embodiment, the one or more data categories may be associated with a particular memory address region or regions. It is understood that the above are merely a few illustrative examples to which the disclosed subject matter is not limited.

As described in more detail in relation to FIG. 2 below, in various embodiments, the memory interconnect 104 may provide the processor 102 with a unified or common interface or protocol for accessing the plurality of storage mediums 116, 126, 136, and 146. Further, the memory interconnect 104 may provide the various storage mediums 116, 126, 136, and 146 with respective interfaces that employ the respective protocols employed by the plurality of storage mediums 116, 126, 136, and 146. In such an embodiment, the memory interconnect 104 may be configured to translate the data access from the unified access protocol to a storage medium specific protocol employed by the storage medium employed to store the data, and vice versa for any responses to the data access.

In various embodiments, each storage medium (e.g., storage mediums 116, 126, 136, and 146) may each respectively include a media controller (e.g., storage controllers 117, 127, 137, and 147) configured to interface with the memory interconnect 104 via an appropriate protocol. In some embodiments, two or more of the storage mediums 116, 126, 136, and 146 may employ the same or a similar protocol. In various embodiments, each storage medium (e.g., storage mediums 116, 126, 136, and 146) may each respectively include a respective memory portion (e.g., storage controllers 118, 128, 138, and 148) configured to store the data.

As described in more detail in relation to FIG. 4 below, in various embodiments, the heterogeneous memory system 106 may include multiple layers of the traditional memory hierarchy. For example, the heterogeneous memory system 106 may include both the traditional second layer of the memory hierarchy (via the DRAM storage medium 116), and the traditional third layer of the memory hierarchy (via the SSD storage medium 136 and the HDD storage medium 146). In such an embodiment, the processor 102 may be freed from the duty of deciding which layer of the traditional memory hierarchy to access. Instead, the memory interconnect 104 may be configured to decide which layer of the traditional memory hierarchy to access.

FIG. 2 is a block diagram of an example embodiment of an apparatus 200 in accordance with the disclosed subject matter. In some embodiments, the apparatus 200 may be or include a memory interconnect (memory interconnect 104 of FIG. 1). In various embodiments, the apparatus 200 may be configured to route a data access 290 from a processor to one of a plurality of storage mediums based, at least in part, upon one or more performance characteristics associated with the respective memory technology of the selected storage medium.

In one embodiment, the apparatus 200 may include a processor I/O interface 202. In such an embodiment, the processor I/O interface 202 may be configured to receive a data access 290 sent from a processor (not shown in FIG. 2, but represented as being connected via the double-sided arrow going off the page). For example, in various embodiments, the processor I/O interface 202 may be configured to interact with a memory I/O interface of a processor (e.g., the memory I/O interface 193 of FIG. 1) The processor I/O interface 202 may also be configured to transmit a result of the data access 290 (e.g., a write confirmation, the requested data 194, etc.) to a processor. In various embodiments, the processor I/O interface 202 may be configured to communicate with the processor via a unified access protocol that allows the processor to access the various storage mediums regardless of the individual protocols they may use.

In various embodiments, the apparatus 200 may include a plurality of memory interfaces 206 (e.g., memory interfaces 216, 226, 296, etc.). In such an embodiment, each of the memory interfaces 206 may be configured to transmit a data access 290 to a respective storage medium (not shown in FIG. 2, but represented as being connected via the double-sided arrow going off the page). Each of the memory interfaces 206 may also be configured to receive a result of a data access 290 (e.g., a write confirmation, the requested data 194, etc.) for a processor. In various embodiments, each of the memory interfaces 206 may be configured to communicate with a specific type of storage medium via a storage medium specific or storage medium type specific protocol. In some embodiments, multiple storage mediums may use or employ the same memory interface. For example, a system may include PRAM and DRAM that make use of similar interface protocols and therefore, may all be accessed by the universal memory controller 204. It is understood that the above is merely one illustrative example to which the disclosed subject matter is not limited.

In one embodiment, the apparatus 200 may include a configurable memory controller 204. In such an embodiment, the configurable memory controller 204 may be configured to dynamically route a data access 290 between the processor and one of a plurality of storage mediums. As described above, in various embodiments, the configurable memory controller 204 may base the routing decision, at least in part, upon one or more performance characteristics associated with each of the respective storage mediums.

In various embodiments, apparatus 200 may include a set of performance characteristics 219. In such an embodiment, the performance characteristics 219 may indicate one or more performance characteristics associated with each respective memory interface 206, and, via proxy, the storage mediums communicatively coupled with the memory interface 206. In such an embodiment, the performance characteristics 219 may be obtained by scanning or querying the storage mediums (e.g., during boot-up, during device initialization, in response to a triggering event such as a hot swap indication, etc.). In another embodiment, the performance characteristics 219 may be entered, from an outside source (e.g., a program, the internet, a device driver, a user, etc.), into a memory of the apparatus 200 that stores the performance characteristics 219.

In some embodiments, the performance characteristics 219 may include information or values that indicate a relative or a course grained amount of accuracy (e.g., a large design tolerance, a minimum performance guarantee, credit, number of memory banks in a memory chip, number of data bus signals to a memory chip, time required to access a memory page column or row, time for memory read or write access, etc.). Whereas, in another embodiment, the performance characteristics 219 may include information or values that indicate a finely detailed amount of accuracy (e.g., performance characteristics measured from the actual storage device, tight design tolerances, etc.). In yet another embodiment, the performance characteristics 219 may include a variety of levels or granularities of accuracy. It is understood that the above are merely a few illustrative examples to which the disclosed subject matter is not limited.

In the illustrated embodiment, the memory controller 204 may consult or read the performance characteristics 219 and employ the performance characteristics 219 (in whole or part) when deciding which storage medium to service the data access 290. As described below in reference to other figures, other factors may be deemed pertinent when routing the data access 290 (e.g., a cache hit, available storage capacity, an operating mode, such as a low-power operating mode, etc.). It is understood that the above are merely a few illustrative examples to which the disclosed subject matter is not limited.

As described above, in various embodiments, the data access 290 may include a data category indicator 294. In some embodiments, this may take the form of a first message that is transmitted prior to the traditional data access message. In one embodiment, the data category indicator 294 may include a message that indicates that all future data accesses (until the next data category message) are to be considered part of a particular data category. In another embodiment, the data category indicator 294 may include a tag, marker, or field within the data access message 290. In yet another embodiment, the data category indicator 294 may be implicit to the data access message 290. For example, the data access 290 may be to a memory address associated with a particular data category. It is understood that the above are merely a few illustrative examples to which the disclosed subject matter is not limited.

In various embodiments, a memory of the apparatus 200 may store one or more storage preferences 239. These storage preferences 239 may influence how and to where the data access 290 is routed. Examples of storage preferences 239 may include (but are not limited to) a preference to store data in a low power storage medium, a preference to maximize (as much as possible) data throughput, a data stability and/or the reliability of a given storage medium, a preference to not exceed a level of wear upon a storage medium (e.g., for a memory technology that has a limited number of write cycles), etc. These storage preferences 239 may be taken into consideration (along with the performance characteristics 219 and data category 294, etc.) when determining the routing of the data access 290.

As described above, in various embodiments, the memory controller 204 may be configured to compare the data category 294 against memory tier parameters 229 and the performance characteristics 219 of the various storage mediums. The memory controller 204 may then attempt to match the data 194 to a particular storage medium given the prevailing storage preferences 239. The data access 290 may then be routed to the selected or target storage medium, via its associated memory interface 206.

In various embodiments, the storage preferences 239 and/or performance characteristics 219 may be dynamically updated as conditions change for the storage medium. For example, if a storage medium is becoming full or running out of available memory locations to store data 194, this may cause the performance characteristics 219 to be updated. In another embodiment, if a storage medium is experiencing data errors, or more generally exceeds a predefined threshold for some characteristic (e.g., operating temperature, number of errors, number of write cycles to given block, etc.), the performance characteristics 219 may be updated.

In yet another embodiment, if a triggering event occurs to the apparatus 200 or the system that includes the apparatus 200 (e.g., a change in the power supply, a change in physical location, a change in the network employed by the system, an instruction from a user, etc.) the storage preferences 239 may be changed. In some embodiments, multiple sets of storage preferences 239 may exist and which set is selected for use at a given moment may depended upon the environment or settings of the system. For example, if a system (and therefore the apparatus 200) is operating on a substantially unlimited power supply (e.g., electrical power from a wall outlet, etc.), the storage preferences 239 may dictate a preference for performance over reliability (e.g., speed and a tolerance for volatile memory, etc.). Conversely, if the system changes (e.g., is unplugged), and then operated via a limited power supply (e.g., a battery, etc.) a second set of storage preferences 239 may be used that dictate a preference for low power consumption and increased reliability in case of power failure (e.g., a preference for a low power, non-volatile memory, etc.). Another example, of a triggering event dynamically changing the active storage preferences 239 may be a storage medium exceeding a threshold (e.g., becoming too hot, etc.), the storage preferences 239 may then change to avoid the hot storage medium, thus allowing it a chance to cool-down. It is understood that the above are merely a few illustrative examples to which the disclosed subject matter is not limited.

In various embodiments, the apparatus 200 may include one or more co-processor or accelerator processors 208. In such an embodiment, these accelerator processors 208 may be special circuits, functional unit blocks (FUBs), and/or combinatorial logic blocks (CLBs) configured to perform a specific task for the memory controller 204, often as part of the routing operation. In some embodiments, the specific task may include helping to determine to which storage medium the data access 290 should be routed. In another embodiment, the specific task may include transforming or translating the data access 290 or a part thereof (e.g., the data 194) between communication protocols or otherwise as part of the routing operation. In some embodiments, the specific task may be direct memory access (DMA) 260 enabling direct transfer among any of storage mediums 116, 126, 136, 146, etc. It is understood that the above are merely a few illustrative examples to which the disclosed subject matter is not limited.

In one embodiment, the apparatus 200 may include a protocol translation circuit 256 configured to translate a data access 290 in a first protocol (e.g., the unified protocol employed by the processor, etc.) to a second protocol (e.g., a storage medium specific protocol, etc.) and vice versa. In some embodiments, the protocol translation circuit 256 may be considered a co-processor or accelerator processor 208.

In various embodiments, the apparatus 200 may include an encryption circuit 258 configured to encrypt and/or decrypt at least the data portion 194 of the data access 290. In some embodiments, the data 194 may be encrypted as it travels a bus that couples a storage medium with the apparatus 200, or the processor with the apparatus 200. In various embodiments, only a sub-set of the plurality of storage mediums may involve encrypted data. In some embodiments, the encryption circuit 258 may be considered a co-processor or accelerator processor 208.

As described below in reference to FIG. 3a, in various embodiments, the apparatus 200 may be configured to treat the plurality of storage mediums as a cache or cache hierarchy. Traditional cache hierarchies that are tightly integrated with a processor or processor core (e.g., the cache hierarchy 192 of FIG. 1) include mechanisms and structures for detecting if a piece of data is within a cache level (e.g., translation look-aside buffers (TLBs), memory address tags, etc.) and protocols for managing the contents of the entire cache hierarchy (e.g., cache hit/miss messages, snoop messages, cache directories, fill requests, etc.). However, traditional storage mediums, such as main memory (e.g., DRAM, etc.) or secondary storage (e.g., HDDs, SSDs, etc.) lack those structures and communication protocols. In the illustrated embodiment, the apparatus 200 may include structures to perform similar tasks for a plurality of storage mediums that have been organized into a tiered system and operate as a cache hierarchy (that is external to a processor).

In the illustrated embodiment, the apparatus 200 may include a cache or tier organizer circuit 252. In various embodiments, this cache or tier organizer circuit 252 may be configured to organize the plurality of storage mediums into a virtual cache hierarchy or organizational structure (e.g., tiers, groups, etc.). For the sake of example, a cache will be focused upon here, and the organization of tier groups discussed in reference to FIGS. 3b and 3c.

In such an embodiment, the cache organizer circuit 252 may be configured to designate storage mediums as layers in a cache hierarchy. In various embodiments, this may be done based upon one or more of the storage type's performance characteristics. For example, a fast but volatile storage medium (e.g., DRAM, etc.) may be a higher layer in the hierarchy, whereas a slower but non-volatile storage medium (e.g., a HDD, etc.) may be a lower layer in the hierarchy. In some embodiments, the grouping or assignment of layers within the hierarchy may be dictated by a set of memory tier parameters 229 or storage preferences 239.

In various embodiments, as data accesses 290 are processed by the memory controller 204, the issue of where the data 194 is currently stored (or to be stored) may arise. As the storage mediums may lack the ability to process cache-like queries (e.g., a cache hit request, a snoop, etc.), the apparatus 200 or other device may be responsible for keeping track of what data 194 is stored where. In various embodiments, the apparatus 200 may include a cache lookup table 254 configured to track where data 194 or a memory address associated with the data is currently stored.

For example, if the data access 290 is a read request, the cache lookup table 254 may indicate that the data 194 is stored in the highest tier of the virtual cache, and the memory controller 204 may route the data access 290 to the higher tier storage medium (e.g., a storage medium coupled with memory type 1 interface 216, etc.). In another example, the cache lookup table 254 may indicate that the data 194 is not stored in the highest tier of the virtual cache, but in the second highest tier, and the memory controller 204 may route the data access 290 to that storage medium (e.g., a storage medium coupled with memory type 2 interface 226, etc.). It is understood that the above are merely a few illustrative examples to which the disclosed subject matter is not limited.

In another example, if the data access 290 is a write request, the cache lookup table 254 may indicate that space is available for the data 194 in the highest tier of the virtual cache, and the memory controller 204 may route the data access 290 to the appropriate storage medium (e.g., a storage medium coupled with memory type 1 interface 216, etc.). In yet another example, the cache lookup table 254 may indicate that there is no space available for the data 194 in the highest tier of the virtual cache, but the memory controller 204, for various reasons (e.g., as dictated by data category 294, storage preferences 239, etc.), may very much desire to store the data 194 in the highest tier of the virtual cache. In such an embodiment, the memory controller 204 may evict a piece of data from the highest tier and move it to a lower tier (updating the cache lookup table 254 as this is done), and then store the new data 194 in the newly available storage location in the highest tier of the virtual cache. In such an embodiment, the apparatus 200 may be configured to generate or issue data accesses on its own to perform maintenance of the virtual cache. It is understood that the above are merely a few illustrative examples to which the disclosed subject matter is not limited.

In various embodiments, the memory controller 204 may update or maintain the cache lookup table 254 every time any data access 290 to the virtual cache hierarchy occurs. In one embodiment, the cache/tier organizer circuit 252 and/or the cache lookup table 254 may be considered a co-processor or accelerator processor 208.

It is understood that the above are merely a few illustrative examples of a co-processors or accelerator processors 208 to which the disclosed subject matter is not limited. In various embodiments, other co-processing circuits 250 may be included in the apparatus 200 and the co-processor or accelerator processor 208.

Figure 3A:
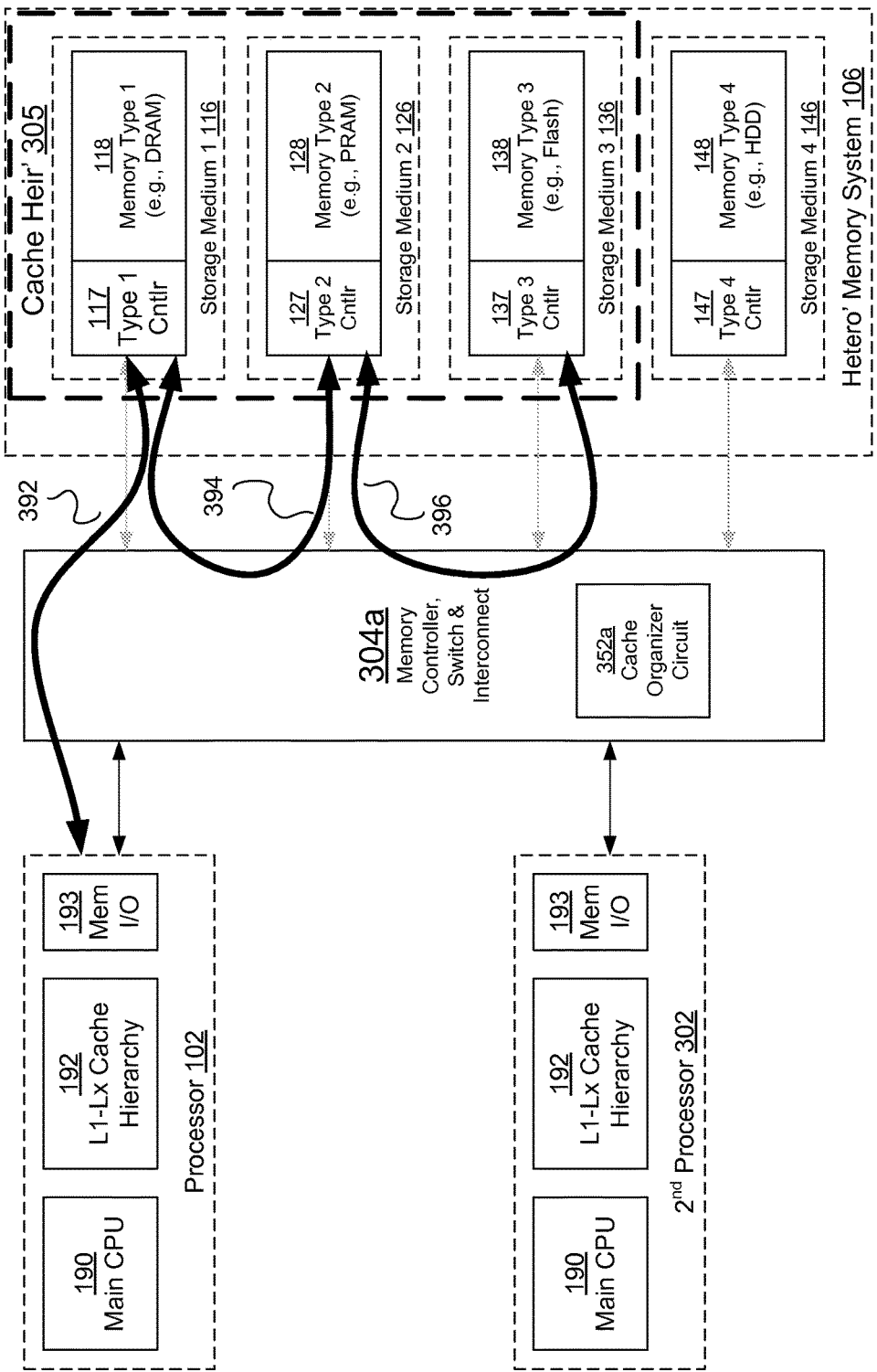
FIG. 3a is a block diagram of an example embodiment of a system in accordance with the disclosed subject matter.

FIG. 3a is a block diagram of an example embodiment of a system 300 in accordance with the disclosed subject matter. In various embodiments, the system 300 may be thought to include a variation or different version of the system 100 of FIG. 1.

In the illustrated embodiment, a multi-processor system is shown. In such an embodiment, the system 300 may include a second processor 302. In various embodiments, more processors may exist within the system (e.g., 4, 6, 8, 16 processors, etc.), but only two are shown for illustrative purposes. Likewise, it is understood that a single processor chip or integrated circuit may include multiple CPU cores.

For example, in one embodiment, server enclosures may include multiple multi-processor computing sub-systems, blades, sleds or units. In such an embodiment, data accesses may be issued by any of the multiprocessor blades to a heterogeneous memory system 106. In some such embodiments, the memory controller or interconnect 304a may be included as part of an accelerator sub-system, blade, sled or unit, and the various computing blades may be coupled to the accelerator blade. In such an embodiment, the memory interconnect 304a may be configured to aggregate data accesses from multiple computing units (e.g., processor 102 and 302, etc.) and distribute them to the heterogeneous plurality of storage mediums (e.g., the heterogeneous memory system 106, etc.). In some embodiments, the memory interconnect 304a may also facilitate some local traffic operations such as peer-to-peer communication between two sub-system memory types.

In various embodiments, if multiple processors are included in a system the system may employ a scheme in which address mapped memory types may be extended using such items as processor ID or similar identifiers. It is understood that the above is merely one illustrative example to which the disclosed subject matter is not limited.

Further, also shown in FIG. 3a is the ability of the memory interconnect 340a to organize the heterogeneous memory system 106 into a cache hierarchy 305. In the illustrated embodiment, the cache hierarchy 305 may include only a subset of the heterogeneous memory system 106, although in another embodiment, the entirety of the heterogeneous memory system 106 may be included. Specifically, in the illustrated embodiment, the cache hierarchy 305 may include the first storage medium 116 (e.g., DRAM, etc.) as the highest tier in the cache hierarchy 305. The cache hierarchy 305 may include the second storage medium 126 (e.g., PRAM, etc.) as the middle tier in the cache hierarchy 305. The cache hierarchy 305 may include the third storage medium 136 (e.g., a FLASH memory, etc.) as the lowest tier in the cache hierarchy 305, and the fourth storage medium 146 (e.g., an HDD, etc.) may remain outside the cache hierarchy 305. It is understood that the above is merely one illustrative example to which the disclosed subject matter is not limited.

As described above, the cache hierarchy 305 may be organized by the memory interconnect 304a, and more specifically a cache organizer circuit 352a included by the memory interconnect 304a. In such an embodiment, the cache organizer circuit 352a may monitor all data accesses to the cache hierarchy 305 and direct the memory interconnect 304a as to where data is stored or may be stored.

For example, the processor 102 may request to read data (via data access 392). The memory interconnect 304a may recognize this data access as being to the cache hierarchy 305 (e.g., as opposed to the forth storage medium 146, or to a specific member of the hierarchy, etc.). In such an embodiment, the memory interconnect 304a may ask the cache organizer circuit 352a (or a lookup table, as described above) which storage medium includes the desired data. In the illustrated embodiment, the data may be stored in the first storage medium 116 and the data access 392 may be routed there. In another embodiment, the data could have been stored in the second storage medium 126 or third storage medium 136 and the data access 392 routed there as appropriate. It is understood that the above is merely one illustrative example to which the disclosed subject matter is not limited.

In another example, the processor 102 may request to write data (via data access 392). Again, the memory interconnect 304a may recognize this data access as being to the cache hierarchy 305 (e e.g., as opposed to the fourth storage medium 146, or to a specific member of the hierarchy, etc.). In such an embodiment, the memory interconnect 304a may ask the cache organizer circuit 352a (or a lookup table, as described above) which, if any, storage medium includes the desired data. In this example, the cache organizer circuit 352a may respond that all three tiers of the cache hierarchy 305 include the data. In such an embodiment, the memory interconnect 304a may select any of the tiers based upon various criteria (e.g., cache tier, data category, performance characteristics, storage preferences, etc.).

In the illustrated embodiment, the data may be stored in the first storage medium 116 and the data access 392 may be routed there. In such an embodiment, the cache organizer circuit 352a may mark, within its internal tables, the copies of the data stored in the third storage medium 136 and the second storage medium 126 as invalid. In such an embodiment, the memory interconnect 304a may be configured to perform cache coherency operations for the cache hierarchy 305.

In one embodiment, the data accesses 394 and 396 illustrate that the memory interconnect 304a may be configured to initiate data accesses on its own. In the illustrated embodiment, this may be done in order to maintain or manage the cache hierarchy 305, although other reasons may occur. Specifically, in one embodiment, once a data write (e.g., data access 392) has updated or written new data to a higher cache level (e.g., storage medium 116), any copies of that data in a lower cache level (e.g., storage mediums 126 and 136) may be considered invalid or stale.

In various embodiments, the memory interconnect 304a may be configured to mirror, within the lower cache levels, the data stored in a higher cache layer. In one such embodiment, this may include mirroring the data within a non-volatile layer of the layered caching memory system 305, if a higher layer of the layered caching memory system 305 that includes the data includes a volatile storage medium.

In the illustrated embodiment, once data is written to the higher cache layer (e.g., storage medium 116), the memory interconnect may initiate data access 394 to write the data to the next cache layer (e.g., storage medium 126). And, again when that is complete the data may be copied to the next cache layer (e.g., storage medium 136), via data access 396. In such an embodiment, once the data has been mirrored it may be deemed to be valid or fresh. Such memory-to-memory transfers may be facilitated through DMA circuit (e.g., the DMA circuit 260 of FIG. 2). In the illustrated embodiment, the data accesses 394 and 396 are shown as reading the data from the higher cache layer and writing to the lower cache layer. In some embodiments, the memory interconnect 304a may include a buffer or other temporary storage element in which the data may be stored. In such an embodiment, the data accesses 394 and 396 may just include writes from the buffer to the lower cache layers. It is understood that the above is merely one illustrative example to which the disclosed subject matter is not limited.

In various embodiments, memory interconnect 304a initiated data accesses may include reading, writing, moving, modifying and/or deleting data. In such an embodiment, the memory interconnect 304a may perform maintenance operations upon the heterogeneous memory system 106. In another embodiment, the memory interconnect 304a may move data up or down within the cache layers. For example, in one embodiment, as data is accessed more frequently, the memory interconnect 304a may be configured to move the data up the cache hierarchy to provide faster access. Conversely, in another embodiment, as data is accessed less frequently, the memory interconnect 304a may be configured to move the data down the cache hierarchy to increase the available space to store more frequently accessed data. It is understood that the above are merely a few illustrative examples to which the disclosed subject matter is not limited.

Figure 3B:
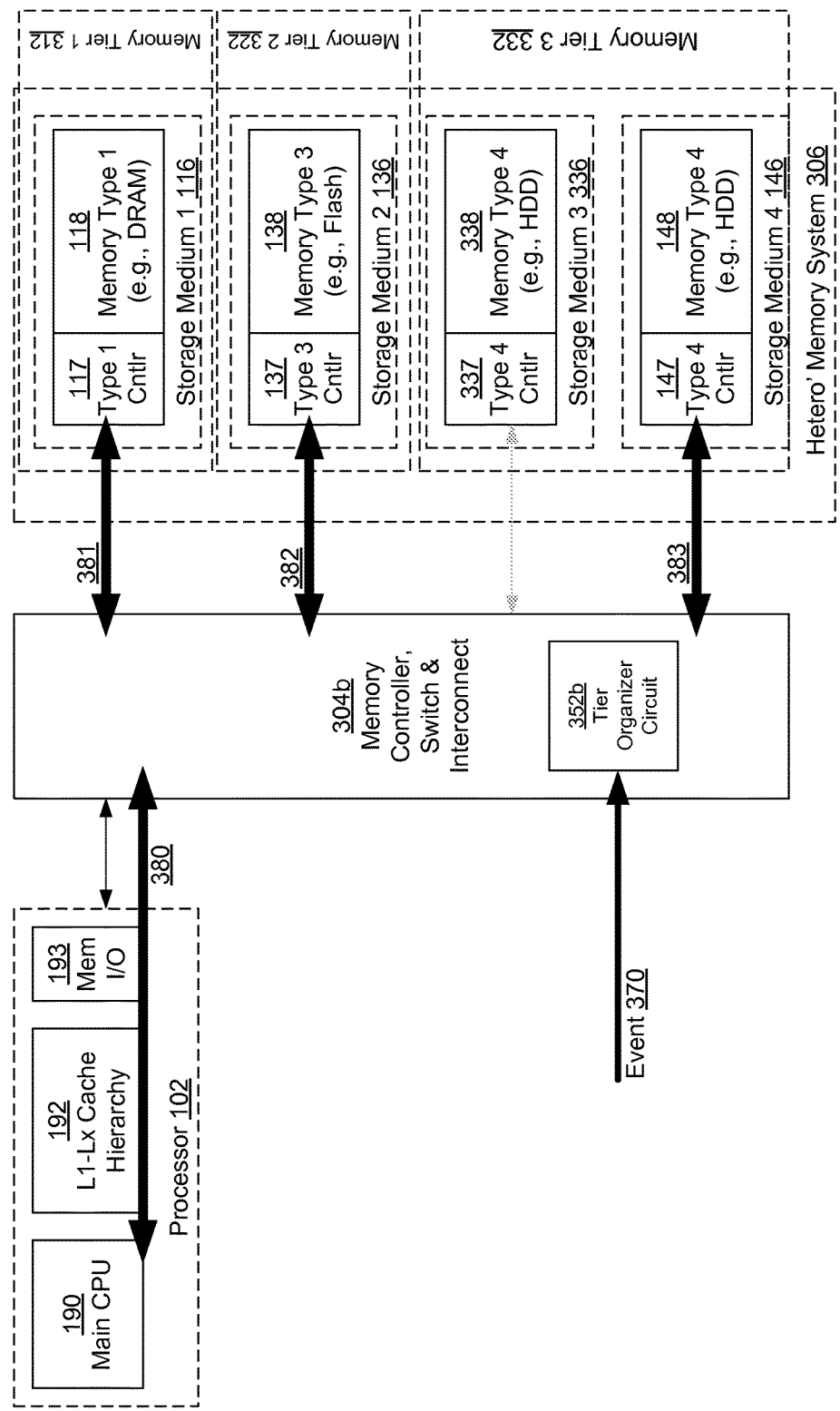
FIG. 3b is a block diagram of an example embodiment of a system in accordance with the disclosed subject matter.

FIG. 3b is a block diagram of an example embodiment of a system 301 in accordance with the disclosed subject matter. In the illustrated embodiment, the system 301 may include the memory interconnect 304b. The memory interconnect 304b may include a tier organizer circuit 352b.

In the illustrated embodiment, the system 301 may include the heterogeneous memory system 306. The heterogeneous memory system 306 may be similar to the heterogeneous memory systems of FIGS. 1 and 3a, with a few differences. For example, the third storage medium 336 may be based upon a HDD technology instead of the Flash or NAND technology of FIGS. 1 and 3a. In such an embodiment, multiple storage mediums (e.g., storage mediums 336 and 146) may be based upon similar or the same technology (e.g., magnetic storage, etc.). It is understood that the above is merely one illustrative example to which the disclosed subject matter is not limited.

Further, in the illustrated embodiment, the Flash-based storage medium 136 has been moved from the third storage medium spot and is now the second storage medium. The PRAM-based storage medium of FIGS. 1 and 3a is totally absent from the system 300. In such an embodiment, the heterogeneous memory system 306 includes a DRAM-based storage medium (storage medium 116), a Flash/NAND-based storage medium (storage medium 136), and two magnetic-based storage mediums (storage mediums 336 and 146). It is understood that the above are merely a few illustrative examples to which the disclosed subject matter is not limited.

As described above, the system 300 may organize these different memory/storage types hierarchically into different tiers. In some embodiments, as described above in reference to FIG. 3a, the tiers may be organized into caching layers with one or more tiers optimizing or improving access to other tiers. In other embodiments, such as that illustrated by FIGS. 3b and 3c, the organization may not be cache-based.

In various embodiments, this organization may be performed by the tier organizer circuit 352b and may be based, at least in part, upon memory tier parameters, performance characteristics, and/or data category needs. It is understood that the above are merely a few illustrative examples to which the disclosed subject matter is not limited.

In the illustrated embodiment, the tiers may be organized by storage or memory technologies. In such an embodiment, the first memory tier 312 may include the DRAM or first storage medium 116. The second memory tier 322 may include the NAND or second storage medium 136. The third memory tier 332 may include the magnetic-based storage mediums 336 and 146.

In such an embodiment, when data access 380 is received from the processor 102, the memory interconnect 304b may determine which memory tier (e.g., tiers 312, 322, or 332) will fulfill or service the data access 380. As described above, this decision may be based upon factors such as: the data category of the data associated with the data access 380, the performance characteristics not only of the individual storage mediums but the tiers themselves, and/or a set of storage preferences. In various embodiments, the data access 380 may be routed as data accesses 381, 382, or 383 depending upon the memory tier selected to receive the data access 380.

In various embodiments, the memory tiers may include various complex data structures or storage systems. For example, the third memory tier 332 includes two storage mediums (e.g., storage mediums 336 and 146), and may include a redundant array of independent disks (RAID) form of storage virtualization. Examples of such a RAID organization may include a mirrored array (RAID-1), a co-mingled or striped array (RAID-1), or another form of virtual storage (e.g., a concatenated or spanning array, just a bunch of disks (JBOD) array, etc.). In various embodiments, with other numbers of storage mediums, other forms of arrays may be employed (e.g. RAID-5, etc.).

In another embodiment, a memory tier may include multiple types (Hybrid) of storage mediums (e.g., both SSD and HDD, etc.) and may (or may not) involve a caching architecture that provides a mixture of the performance characteristics of the separate storage mediums. In such an embodiment, the aspects of a tiered or partitioned organization of the heterogeneous memory system 306 may be combined with the aspects of cache hierarchy organization of the heterogeneous memory system 306. For example, in various embodiments, the first tier 312 and third tier 332 may include no caching aspects (or none provided by the memory interconnect 340b), but the second tier 322 may include a cache hierarchy similar to that described above in reference to FIG. 3a.

In a specific example, a tier that provides a hybrid of two or more storage mediums may be primarily based upon magnetic technology storage medium(s) (e.g., an HDD), but have a smaller Flash portion (e.g., a single SSD, etc.) that provides faster access for a small portion of the total data stored by the hybrid tier. In such an embodiment, the two or more distinct storage mediums may be included in a tier and organized as a multiple layered cache hierarchy. In some embodiments, the memory interconnect 304b may mange the caching aspects (e.g., cache hits, cache coherency, etc.), as described above. In other embodiments, a separate memory controller (not shown) may exist to manage such caching aspects. It is understood that the above are merely a few illustrative examples to which the disclosed subject matter is not limited.

In various embodiments, the tier or cache hierarchy may include only a portion of a specific storage medium. For example, in one embodiment, a layer of cache hierarchy may include 25% (or other amount) of a storage medium (e.g., storage medium 136, etc.) and the rest may be reserved for non-caching use. In various embodiments, the memory interconnect 304b may be configured to dynamically adjust the amount or portion of a storage medium that is reserved for a cache or tier. It is understood that the above is merely one illustrative example to which the disclosed subject matter is not limited.

Figure 3C:
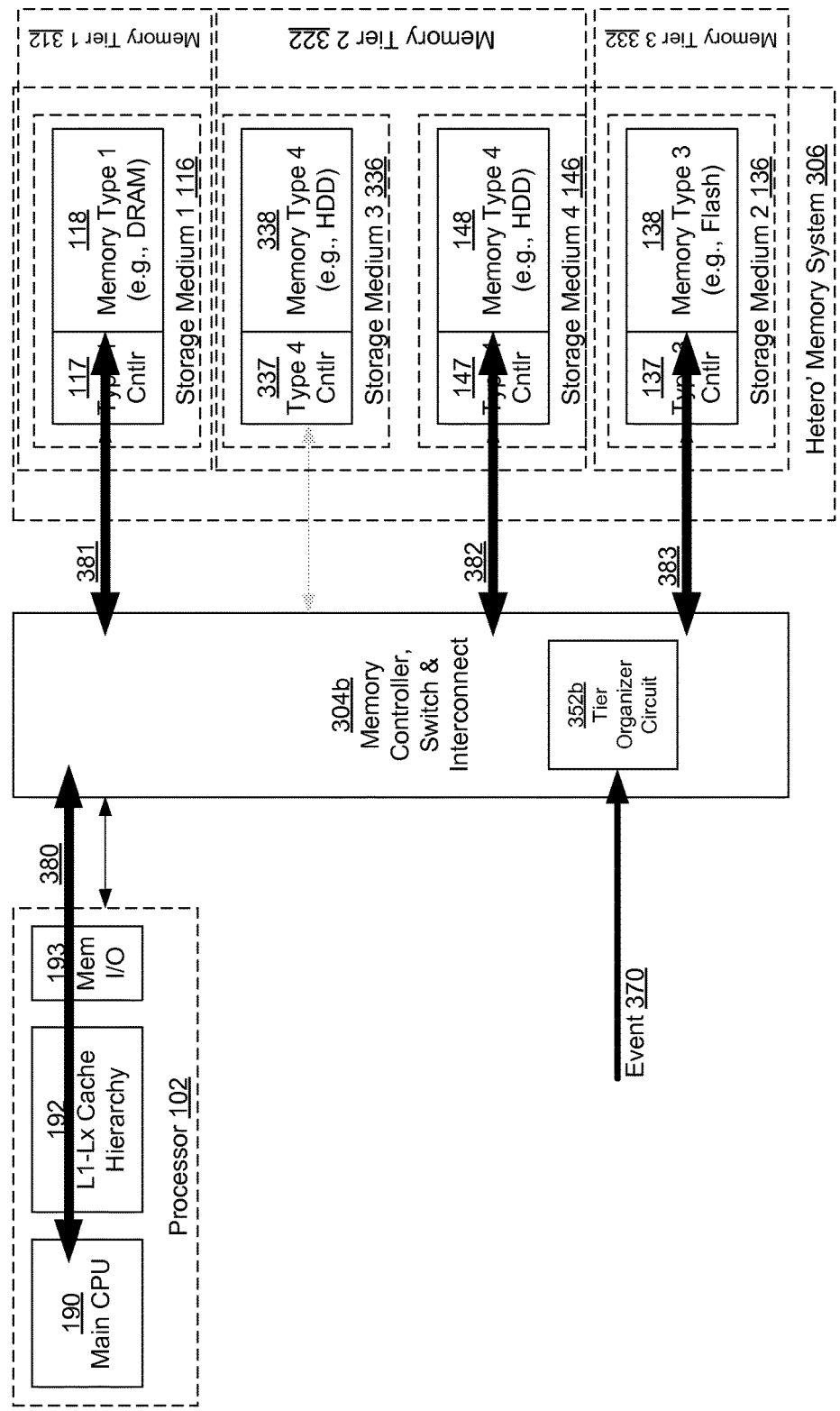
FIG. 3c is a block diagram of an example embodiment of a system in accordance with the disclosed subject matter.

FIGS. 3b and 3c also illustrate the system 301's response to a triggering event 370. As described above, the memory interconnect 304b may be configured to organize the heterogeneous memory system 306 into a hierarchy of storage medium tiers (e.g., tiers 312, 322, and 332, etc.) based, at least in part upon, the one or more performance characteristics associated with each type of storage medium.

In the illustrated embodiment, the memory interconnect 304b has organized the tiers according to speed. In various embodiments, the tiers 312, 322, and 332, may be given preferential treatment in that the first tier 312 is fastest and may be more desirable. Likewise with the second tier 322, and least of all with the third tier 332. However, as shown in FIG. 3b, a triggering event 370 may occur (e.g., storage medium 136 may suddenly exceed an error threshold or a temperature threshold, etc.). As shown in FIG. 3c, upon receipt of this triggering event 370 the memory interconnect 304b may be configured to dynamically re-organize the hierarchy of storage medium tiers (e.g., tiers 312, 322, and 332). In the illustrated embodiment, the tiers have been re-organized (relative to FIG. 3b) such that the faulty storage medium 136 is now the third memory 332, and the two HDD storage mediums 336 and 146 are now the second memory tiers 322. In such an embodiment, the faulty storage medium 136 may be the least preferred storage medium and may be avoided whenever possible. In one such embodiment, the faulty storage medium 136 may only be used to fulfill read data accesses and write data accesses may occur to the other tiers (e.g., data may be slowly and, as transparently as possible to the processor, moved off the faulty storage medium and onto the non-faulty storage mediums, etc.). It is understood that the above is merely one illustrative example to which the disclosed subject matter is not limited.

It is understood that there may be a number of other ways to re-organize the tiers (e.g., tiers 312, 322, and 332) and a number of other triggering events 370 that may cause the memory interconnect 304b to perform a reorganization. While FIG. 3c shows a re-organization in the preference of tiers (e.g., moving the storage medium 136 to the third tier 332, etc.), the storage mediums that are included in various tiers may be re-organized. For example, the second tier 322 may have been re-formed by adding the storage medium 336 to the storage medium 136. In such an embodiment, the Flash-based storage medium 136 may have acted as a cache for the HDD-based storage medium 336 (e.g., providing both speed and storage capacity, etc.). Other forms of tiers are possible, especially given other forms or types of storage mediums (e.g., PRAM, MRAM, etc.). It is understood that the above are merely a few illustrative examples to which the disclosed subject matter is not limited.

Figure 4:
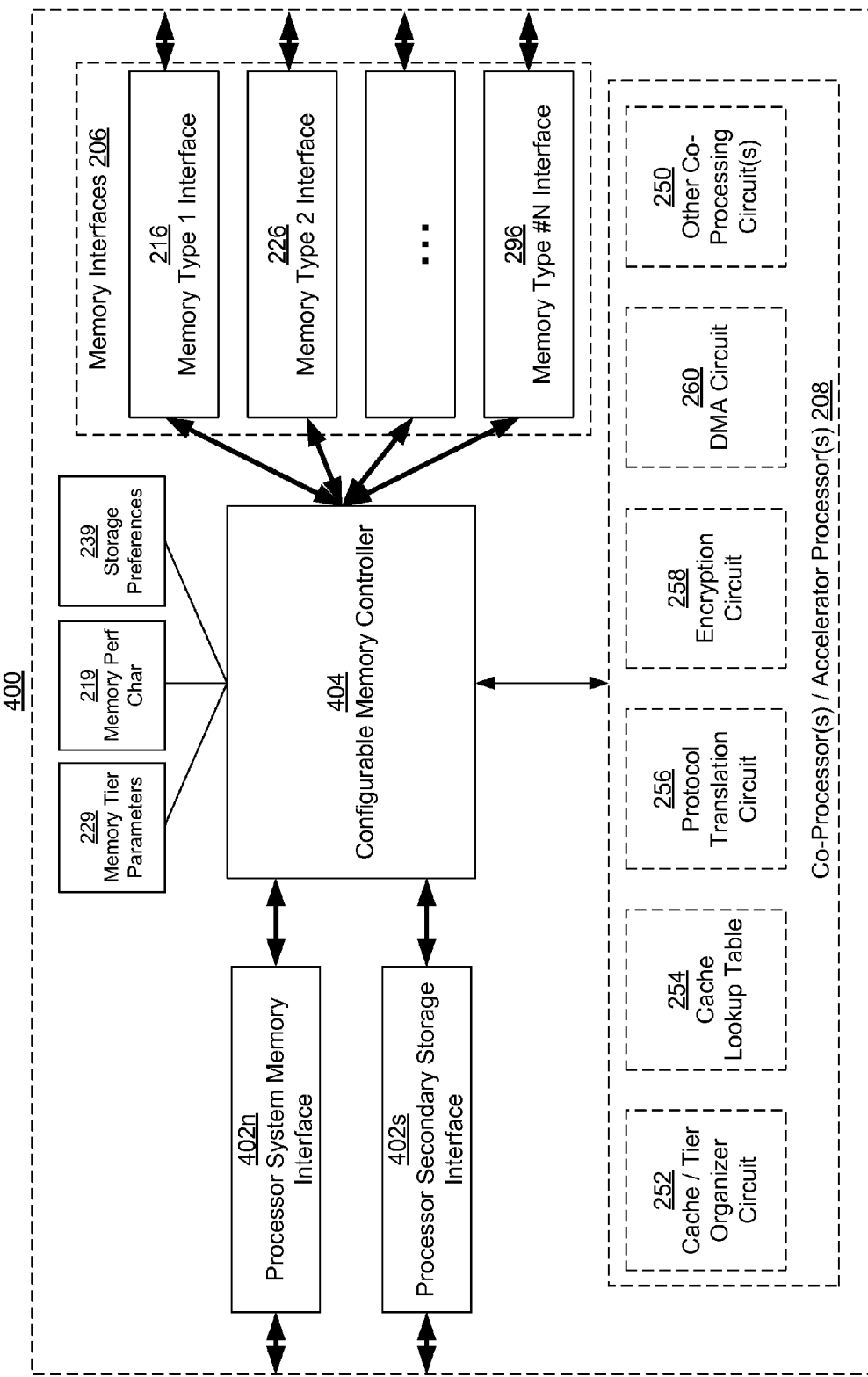
FIG. 4 is a block diagram of an example embodiment of an apparatus in accordance with the disclosed subject matter.

FIG. 4 is a block diagram of an example embodiment of an apparatus 400 in accordance with the disclosed subject matter. The apparatus 400 may be or include a memory interconnect (e.g., memory interconnect 104 of FIG. 1, etc.) and may be similar to the system 200 of FIG. 2. While the system 200 of FIG. 2 illustrates an embodiment in which a unified access protocol is employed by the processor or processors, the system 400 illustrates the use of multiple access protocols by the processor or processors.

Traditionally, a processor interacted with system or main memory (e.g., DRAM, etc.) and any secondary memory (e.g., HDD, etc.) via a portion of a chipset known as a "north bridge". The north bridge separated the communication for the system memory from the communication for the secondary memory. The north bridge would communicate directly with the system memory via a first protocol, and the communication for the secondary memory would be passed to anther portion of the chipset known as the "south bridge". The south bridge then communicated with the secondary memory via a second protocol. Eventually, the system memory portion of the north bridge was moved or integrated into the processor itself (e.g., a memory chip controller (MCC), integrated memory controller (IMC), etc.). Often, the processor communicates directly with the system memory (via the MCC) via the first protocol, and communication with a secondary memory is passed off the chipset (e.g., via an I/O Controller Hub (ICH), Platform Controller Hub (PCH), etc.), which uses a second protocol.

While the embodiment of FIG. 2 makes use of a single unified access protocol to communicate with the memory interconnect, current (and traditional) processors make use of at least two protocols for data accesses (a first for system memory, and a second for secondary memory). Therefore, the use of a single unified access protocol may be used in embodiments in which the processor has changed from the traditional two protocol practice. In the illustrated embodiment of FIG. 4, the apparatus 400 is configured to make use of the multiple protocols employed by traditional processors.

In one embodiment, the apparatus 400 may include a processor system memory interface 402n configured to receive a data access sent from a processor (not shown) and directed to a system memory (e.g., a DRAM, etc.). The processor I/O interface 402n may also be configured to transmit to a processor a result of a data access (e.g., a write confirmation, the requested data 194, etc.) that the processor expected to be made to the system memory. In various embodiments, the processor I/O interface 402n may be configured to communicate with the processor via the first access protocol typically employed by an integrated memory controller (IMC) or similar circuit.

In one embodiment, the apparatus 400 may include a processor secondary memory interface 402s configured to receive a data access sent from a processor and directed to a secondary memory (e.g., a HDD, a SSD, etc.). The processor I/O interface 402s may also be configured to transmit to a processor a result of a data access (e.g., a write confirmation, the requested data 194, etc.) that the processor expected to be made to the secondary memory. In various embodiments, the processor I/O interface 402s may be configured to communicate with the processor via the second access protocol typically employed by an I/O Controller Hub (ICH) or similar circuit.

In various embodiments, the apparatus 400 may include an integrated connection fabric and memory controller 404 configured to process data accesses from both the processor system memory interface 402n and the processor secondary storage interface 402s. In various embodiments, the memory controller 404 (or co-processor circuit 208) may be configured to translate either of these processor protocols to storage medium based protocol, and vice versa.

Further, in various embodiments, the memory controller 404 may be configured to route a data access from a storage medium expected by the processor to another storage medium. For example, if a data access is made via the processor system memory interface 402n, the processor expects that the data access will occur to system memory (e.g., memory type 1 interface 216, etc.). However, for various reasons, the memory controller 404 may decide that the data access should occur to a different storage medium (e.g., a PRAM, NAND, etc.), and may route the data access as it desires. In such an embodiment, the memory controller 404 may be configured to hide or simply not mention the change in storage medium from the processor.

In another embodiment, the memory controller 404 may be configured to follow or honor the storage medium expectations of the processor; such that all data accesses occurring via the processor system memory interface 402n may occur to the system memory (e.g., memory type 1 interface 216, etc.). It is understood that the above are merely a few illustrative examples to which the disclosed subject matter is not limited.

In various embodiments, the apparatus 400 may include different interfaces (e.g., interface 402n, 402s, etc.) for different processors. In such an embodiment, a multi-processor system may allow greater or even uncongested access to the apparatus 400. In such an embodiment, various processors may employ different communication protocols. It is understood that the above is merely one illustrative example to which the disclosed subject matter is not limited.

Figure 5:
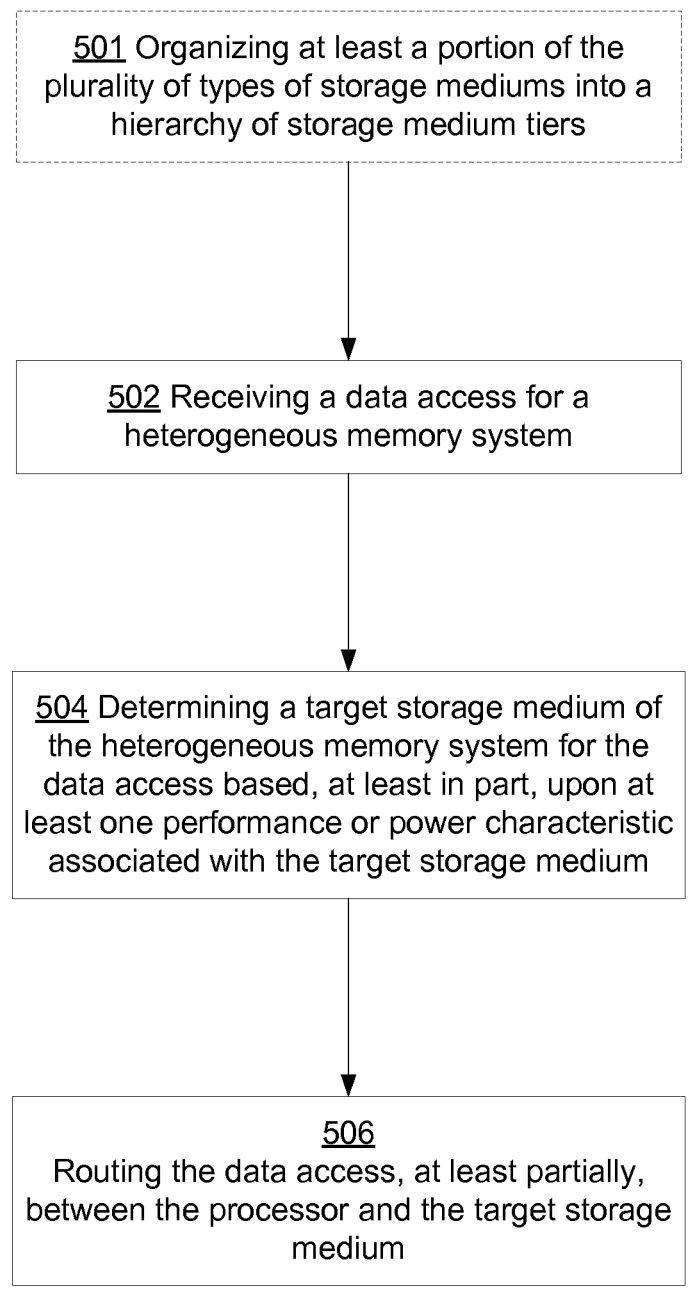
FIG. 5 is a flowchart of an example embodiment of a technique in accordance with the disclosed subject matter.

FIG. 5 is a flow chart of an example embodiment of a technique in accordance with the disclosed subject matter. In various embodiments, the technique 500 may be used or produced by the systems such as those of FIG. 1, 3a, 3b, 3c, or 9. Furthermore, portions of technique 500 may be used or produced by the systems such as that of FIG. 2 or 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a data access for a heterogeneous memory system may be received, as described above. In one embodiment, the data access may be received from a processor and by a memory interconnect. In various embodiments, the heterogeneous memory system may comprise a plurality of types of storage mediums, as described above. In some embodiments, each type of storage medium may be based upon a respective memory technology and is associated with one or more performance characteristics, as described above. In various embodiments, the heterogeneous memory system may include a volatile main system memory storage medium and a non-volatile secondary storage medium, as described above.

In various embodiments, the plurality of types of storage mediums may be based upon two or more different memory technologies, as described above. In some embodiments, the plurality of types of storage mediums includes storage mediums based upon three or more different memory technologies selected from a group consisting essentially of:

Dynamic Random Access Memory (DRAM), Resistive Random Access Memory (RRAM), Phase change Random Access Memory (PRAM), Magnetic Random Access Memory (MRAM), NAND flash memory, and magnetic storage, as described above.

In one embodiment, receiving may include receiving the data access in a form of a unified access protocol, as described above. In another embodiment, receiving the data access may include receiving a data accesses for a first group of one or more storage mediums via a first access protocol, and receiving a data accesses for a second group of one or more storage mediums via a second access protocol, as described above.

In various embodiments, one or more of the action(s) illustrated by this Block may be performed by the apparatuses or systems of FIG. 1, 2, 3*a*, 3*b*, 3*c*, 4, or 9, the memory interconnect or processor of FIG. 1, 2, 3*a*, 3*b*, 3*c*, or 4, as described above.

Block 504 illustrates that, in one embodiment, a storage medium of the heterogeneous memory system may be determined as the target storage medium for the data access based on various characteristics as described above. In various embodiments, this determination may occur based, at least in part, upon at least one performance characteristic associated with the target storage medium, as described above. In various embodiments, one or more of the action(s) illustrated by this Block may be performed by the apparatuses or systems of FIG. 1, 2, 3*a*, 3*b*, 3*c*, 4, or 9, the memory interconnect of FIG. 1, 2, 3*a*, 3*b*, 3*c*, or 4, as described above.

Block 506 illustrates that, in one embodiment, the data access may be routed, at least partially, between the processor and the target storage medium, as described above. In one embodiment, routing may include translating the data access from the unified access protocol to a storage medium specific protocol employed by the target storage medium, as described above. In various embodiments, receiving the data access may include receiving an indication of a data category associated with the data access. In such an embodiment, routing may include preferentially routing the data to one of the plurality of types of storage mediums based upon the data category, as described above. In some embodiments, the data category associated with the data may be set during a compilation of a software program that, when executed by the processor, causes the data access, as described above. In various embodiments, one or more of the action(s) illustrated by this Block may be performed by the apparatuses or systems of FIG. 1, 2, 3*a*, 3*b*, 3*c*, 4, or 9, the memory interconnect of FIG. 1, 2, 3*a*, 3*b*, 3*c*, or 4, as described above.

Block 501 illustrates that, in one embodiment, at least a portion of the plurality of types of storage mediums may be organized into a hierarchy of storage medium tiers, as described above. In some embodiments, this organization may be based, at least in part upon, the one or more performance characteristic associated with each type of storage medium, as described above. In various embodiments, organizing may include organizing the hierarchy of storage medium tiers into a layered caching memory system, as described above. In such an embodiment, organizing the hierarchy of storage medium tiers into a layered caching memory system may include monitoring the data contents of each storage medium within the layered caching memory system, as described above. In such an embodiment, determining may include determining which, if any, storage mediums, include a piece of data associated with the data access, as described above. In such an embodiment, routing may include routing the data access to a storage medium included within a highest layer of the layered caching memory system that includes the piece of data associated with the data access, as described above. In various embodiments, the technique 500 may further include mirroring the piece of data within a non-volatile layer of the layered caching memory system, if the highest layer of the layered caching memory system that includes the piece of data associated includes a volatile storage medium, as described above.

In some embodiments, the technique 500 may further include dynamically re-organizing the hierarchy of storage medium tiers in response to a triggering event, as described above. In such an embodiment, the triggering event may include an at least partial failure of a compromised storage medium included by the heterogeneous memory system, as described above. In one embodiment, dynamically re-organizing may include reducing a usage of the compromised storage medium, as described above. In various embodiments, one or more of the action(s) illustrated by this Block may be performed by the apparatuses or systems of FIG. 1, 2, 3*a*, 3*b*, 3*c*, 4, or 9, the memory interconnect of FIG. 1, 2, 3*a*, 3*b*, 3*c*, or 4, as described above.

FIG. 6*a* is a block diagram of an example embodiment of a system 600 in accordance with the disclosed subject matter. In the illustrated embodiment, the system 600 may include one or more virtual machines 602 making use of a heterogeneous memory system 106, as described above. In such an embodiment, the memory usage of the virtual machines 602 may be routed within the heterogeneous memory system 106 to take advantage of the various physical characteristics of the storage mediums, thereof.

As described above, in various embodiments, the heterogeneous memory system 106 may include a plurality of different storage mediums (e.g., storage mediums 116, 126, 136, 146, etc.). In such an embodiment, the heterogeneous memory system 106 may include different types of storage mediums based upon a variety of storage technologies. In some embodiments, these technologies may include, but are not limited to, for example, DRAM, Phase-change RAM (PRAM), NAND or flash memory (e.g., SSD, etc.), Resistive RAM (RRAM), Magnetoresistive RAM (MRAM), magnetic memory (e.g., a HDD, etc.), etc. It is understood that the above are merely a few illustrative examples to which the disclosed subject matter is not limited.

Likewise, in the illustrated embodiment, the system 600 may include one or more physical or host processors or central processor units (CPUs) 662 and other hardware and/or software components (e.g., host operating system (OS), network controller/interface, chipset, etc.). In such an embodiment, these physical or host hard components 662 may be employed to execute the virtual machines 602.

In the illustrated embodiment, the system 600 may include one or more virtual machines (VMs) 602. While three VMs 602, 602*a*, and 602*b* are illustrated it is understood that the above is merely one illustrative example to which the disclosed subject matter is not limited. In various embodiments, a VM 602 includes an emulation of a computing system. In a specific embodiment, the VM 602 may include an emulation of a substantially complete system platform or device that supports the execution of a complete operating system (OS) and one or more applications. In the parlance of VMs the real or physical hardware/software executing or performing the emulation is referred to as the "host", whereas the emulated or virtual hardware/software is referred to as the "guest".

In various embodiments, a virtual machine 602 may include a virtual processor 692, a virtual memory I/O interface 694 and general other virtual hardware devices (e.g., network interface, storage medium, etc.) that are emulated. Further, in various embodiments, the virtual machine 602 may execute a guest operating system (OS) 696 and one or more applications 698. In various embodiments, the VM 602 may process data 682. As part of the VMs processing of the data 682, the data 682 may be stored in the physical memory of the system 600 (e.g., the heterogeneous memory stem 106, etc.) and accessed (e.g., read, written to, etc.) via a data access.

In the illustrated embodiment, the system 600 may include a virtualization layer or memory management unit (MMU) 604. In some embodiments, the MMU 604 may include the memory interconnect of FIG. 1, 2, 3a, 3b, 3b, or 5, as described above. In the illustrated embodiment, the MMU 604 may be configured to route data or memory accesses between the VMs 602 and the heterogeneous memory system 106, or more specifically, the storage mediums 116, 126, 136, 146, etc. of the heterogeneous memory system 106.

In various embodiments, each VM 602 may execute various applications 698, and each of those applications 698 may have different system resource requirements or desires. For example, one application 698 may be a file server or database, and may desire fast read/write access to information stored in a substantially non-volatile format. Another application 698 may be a web server and may desire fast read access to data that is mostly cached in a volatile memory. In yet another embodiment, an application 698 may be a batch or compilation server (e.g., for executing small programs, etc.) and may be concerned with fast read/write access to data stored in a volatile memory that is eventually written to a non-volatile storage medium. It is understood that the above are merely a few illustrative examples to which the disclosed subject matter is not limited.

However, whatever the VM 602 or application's 698 purpose (e.g., infrastructure-as-a-service (IaaS), software-as-a-service (SaaS), platform-as-a-service (PaaS), etc.) and system resource desires (e.g., reliable storage, fast reads, fast writes, transactions-per-second, etc.), the VMs 602 may be associated with a certain quality-of-service (QoS). In various embodiments, the QoS may guarantee or set as a desire a certain level of performance provided by the VM 602 or the application 698. In some embodiments, these QoS guarantees may be enforced by a service-level agreement (SLA). As such, when someone executes the application 698 they know the application 698 will perform to a certain level of quality.

A guaranteed level of QoS may be desirable or important (to various users), as one of the features of a VM 602 is that it may be moved substantially seamlessly from one set of physical hardware to another. These various pieces of hardware may differ and may therefore have different physical characteristics but, with a QoS agreement, a minimum level of performance quality may be assured.

In the illustrated embodiment, each VM 602 or application 698 may be associated with a QoS Tag 670, 670a, or 670b that indicates a level of QoS expected by that application 698 or VM 602. For example, one QoS tag 670 may indicate that the application 698 expects or desires that a memory latency of 100 nanoseconds (ns) is the minimum memory latency for this application 698. In such an embodiment, the system 600 may be configured to provide the application 698 with physical hardware that meets this 100 ns minimum latency requirement.

In such an embodiment, the MMU 604 may be configured to allocate or route data accesses among the various storage mediums (e.g., mediums 116, 126, etc.) or memory technologies based upon the application's 698 QoS requirements (as expressed in the associated QoS tag 670). Further, in various embodiments, the MMU 604 may also be configured to migrate stored data or memory pages between storage mediums when the QoS guarantees are no longer required, or may be relaxed (e.g., as determined by a triggering event, etc.).

In the illustrated embodiment, when a VM 602 is migrated or first executed on the system 600, the MMU 604 (or the host CPU 662) may be configured to read the QoS tag 670. In some embodiments, the QoS tag 670 may include a first portion 672 that indicates a performance characteristic or metric of interest guaranteed by the virtual machine. Based, in part, upon the VM's 602 sensitivity to a given performance characteristic, the MMU 604 may be configured to allocate or route memory accesses from the VM 602 to a corresponding storage medium (e.g., storage medium 116, 126, etc.) that fulfills or addresses the VM's 602 performance characteristic. For example, if the VM 602 or application 698 is latency sensitive (as determined by the QoS), when it is first migrated on to a host server (e.g., system 600), all the new page or memory allocations may be done in the space allocated to the faster memory technologies available (e.g., storage medium 116 or 126, etc.).

In the illustrated embodiment, the QoS tag 670 may include a second portion 674 that indicates a range of values or a threshold value for the performance characteristic requirement of the VM 602. Again, the MMU 604 may read this tag portion 674 and then use that value to decide where to route the VM's 602 memory accesses. For example, if the second part 674 states a 100 ns latency requirement or threshold, the VM 602 or application 698 memory access or pages may be allocated to DRAM (storage medium 116) that meets the 100 ns requirement. Similar decisions can be made to maximize the utilization of the entire memory space depending on the types of memory technologies that are available.

In one embodiment, the MMU 604 may include a memory characteristic list or database 611 that associates the actual storage mediums, memory mediums, or memory technologies (e.g., storage medium 116, 126, etc.) with the particular physical characteristics they embody (e.g., a latency less than 100 ns, non-volatility, maximum number of writes, write speed, storage size, etc.). In some embodiments, this list 611 may be populated during the startup of system 600. In another embodiment, the list may be updated periodically or upon a triggering event (e.g., the addition of a storage medium to the memory system 106, etc.).

In some embodiments, the values or data from the QoS tags 670 (e.g., QoS tag 670a, 670b, etc.) may be added to the memory characteristic list 611. In such an embodiment, the QoS requirements of the VMs 602 or applications 698 may be mapped to or associated with various corresponding storage medium(s). In some embodiments, the mapping or associations may be from one QoS tag 670 to multiple storage mediums. In one such embodiment, the mapping may indicate a hierarchy or levels of preference of storage mediums. For example, if the QoS tag 670 indicates a latency requirement of 100 ns, the memory characteristic list 611 may associate memory accesses from the application 698 (in turn associated with the QoS tag 670) primarily with DRAM (storage medium 116), but secondarily with the PRAM (storage medium 126). In such an embodiment, if for some reason accessing the DRAM 116 is not possible or desirable, the MMU 604 may route the memory access from the application 698 to the PRAM 126. It is understood that the above is merely one illustrative example to which the disclosed subject matter is not limited.

In the illustrated embodiment, the MMU 604 may include a memory router 610 configured to select a target storage medium of the heterogeneous memory system 106 for the data access based, at least in part, upon at least one performance characteristic associated with the target storage medium and a quality of service tag 670 that is associated with the virtual machine 602 or application 698 and that indicates one or more performance characteristics guaranteed by the virtual machine 602 or application 698. In one embodiment, when a VM 602 makes a memory access (e.g., a read, a write, etc.) to the heterogeneous memory system 106 the MMU 604 may be responsible to translating the virtual address space employed by the VM 602 to an actual address space employed by the system 600. In some embodiments, the actual address space may include a flat-memory space.

In various embodiments, the memory router 610 may receive the memory access (e.g., write data 682, etc.) and notice that the memory access is associated with a particular VM 602 or application 698 and therefore a particular QoS tag 670. In such an embodiment, the memory router 610 may then compare the physical characteristic requirement(s) of the QoS tag 670 (e.g., a latency under 100 ns, etc.) with the physical characteristics of the storage mediums. In one embodiment, the physical characteristic information may be stored in the memory characteristic list 611.

In such an embodiment, the memory router 610 may match memory access up with an appropriate storage medium (e.g., storage medium 126, etc.) and route the data access to that target storage medium (as illustrated by the thick line of FIG. 6a). As described above, in some embodiments, an association between a VM 602 and/or application 698 may be stored in the memory characteristic list 611.

As described above, in various embodiments, the target storage medium selected may not be the storage medium most advantageous to meeting the QoS guarantee. In such an embodiment, the memory router 610 may considered additional factors when selecting a target storage medium, such as, for example, amount of free storage space, bandwidth to the storage medium, congestion to the storage mediums, reliability of the storage medium, etc. In one such embodiment, the MMU 604 may include a free page list 612 configured to maintain a count of an amount of allocable storage space associated with each storage medium. In such an embodiment, if the preferred target storage medium does not have enough free space for the data access (e.g., due to the size of the data access, due to a quota system, other threshold values, etc.), the memory router 610 may select a secondary or less preferred (e.g., tertiary, etc.) storage medium as the target storage medium. For example, if the DRAM 116 is the preferred target storage medium but is too full (e.g., as judged by a threshold value, etc.), the memory router 610 may select the PRAM 126 as the target storage medium. It is understood that the above is merely one illustrative example to which the disclosed subject matter is not limited.

Figure 6B:
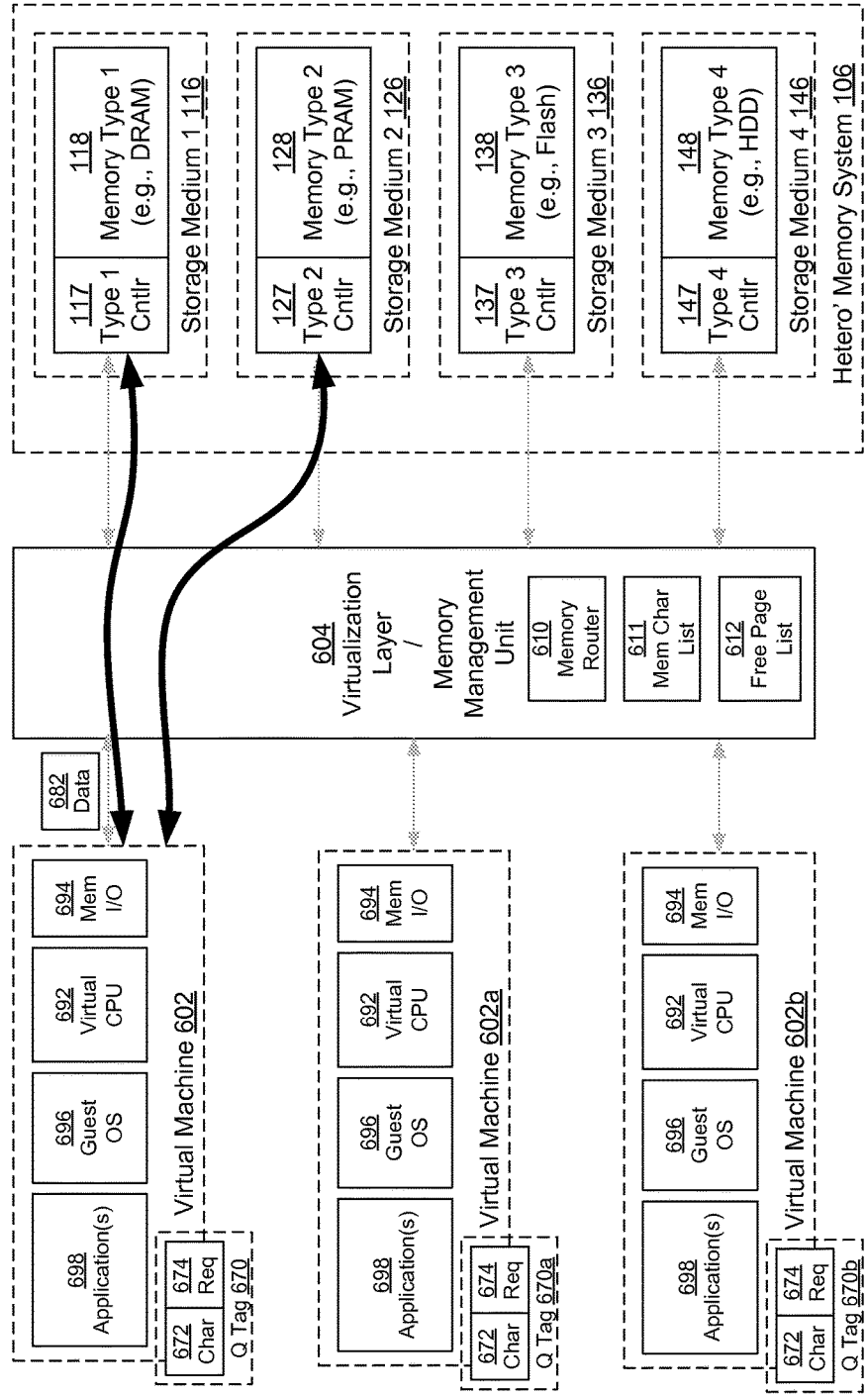
FIG. 6b is a block diagram of an example embodiment of a system in accordance with the disclosed subject matter.

FIG. 6b is a block diagram of an example embodiment of a system 600 in accordance with the disclosed subject matter. In such an embodiment, the MMU 604 may be configured to allocate data associated with the virtual machine 602 or application 698 across two or more of the storage mediums (e.g., storage medium 116 and 126, storage medium 126 and 146, etc.). In some embodiments, those two or more storage mediums may share the same physical address space. In some embodiments, this may be because the heterogeneous memory system 106 includes a flat memory space. In another embodiment, this may be because the two or more storage mediums are part of the same portion of the heterogeneous memory system's 106 non-flat memory space. It is understood that the above are merely a few illustrative examples to which the disclosed subject matter is not limited.

Further, in some embodiments, the data access may include a read access in which data 682 is already stored in a storage medium (e.g., storage medium 116, etc.). In such an embodiment, the memory router 610 may be configured to select, as the target storage medium, the storage medium that already includes the requested data 682 regardless of the physical characteristics of the storage medium and/or the QoS tag 670. In various embodiments, if the data 682 is then edited or modified and re-written to the heterogeneous memory system 106, the MMU 604 may then determine if the data 682 should be routed according to the physical characteristics of the storage medium and the QoS tag 670, or if the data access should be routed to the storage medium where the data 682 was previously stored. For example, if the data 682 is re-written in its entirety or majority, the data 682 may be moved from a less preferred storage medium (e.g., PRAM 126, etc.) to a more preferred storage medium (e.g., DRAM 116, etc.). Conversely, if the data 682 is part of a much larger file or data set that has not been modified, the MMU 604 may choose to keep the data 682 with the larger file or data set on the less preferred storage medium (e.g., PRAM 126, etc.). It is understood that the above are merely a few illustrative examples to which the disclosed subject matter is not limited. In some embodiments, the MMU 604 may select to actively or dynamically move data 682 between storage medium, as described in relation to FIG. 7.

FIG. 7 is a block diagram of an example embodiment of a system 700 in accordance with the disclosed subject matter. In the illustrated embodiment, the system 700 may include a heterogeneous memory system 106 and one or more virtual machines (VMs) 602, as described above. In the illustrated embodiment, the system 700 may also include a virtualization layer or memory management unit (MMU) 704. In various embodiments, the MMU 704 of FIG. 7 may include (in whole or part) the MMU 604 of FIGS. 6a and 6b, and vice versa.

In the illustrated embodiment, data 682 may already be stored in the heterogeneous memory system 106 (e.g., on storage medium 116, etc.). As described above, in various embodiments, the QoS tag 670 may include a second or requirement portion 674 that indicates a range of values or a threshold value for the performance characteristic guaranteed by the VM 602 or application 698. In the illustrated embodiment, the second portion 674 may indicate that the QoS guarantee may be relaxed or reduced. In some embodiments, the second portion 674 may include a list of times or event that may cause the relaxation or intensification of the QoS guarantees. In this context, these times or events may be referred to as "triggering events". In various embodiments, the second portion 674 may include a list of new or alternate ranges or threshold value(s) associated with the relaxed or levels of the QoS guarantees.

For example, in one embodiment, the triggering event may be lack of usage of a memory page or block of memory. In such an embodiment, the QoS tag 670 may indicate that if a page or portion of memory is not accessed (e.g., read to, written from, read to or written from, etc.) within a certain period of time (e.g., 10 minutes, 50 memory accesses, etc.) that the QoS guarantees associated with the page or portion of memory may be relaxed. In such an embodiment, the MMU 704 may be configured to move or migrate the data from a first storage medium to a second storage medium.

In such an embodiment, the MMU 704 may include an event detector 711 configured to detect that a triggering event has occurred (e.g., a page has not been accessed within the triggering threshold value, etc.). In such an embodiment, once an event has occurred the MMU 704 may actively move the data between storage mediums.

In some embodiments, the MMU 704 may include a CPU interface 716 configured to receive/send memory accesses between the MMU 704 and the host CPU 662 or virtual machine 602, and this may be how normal memory accesses are initiated with the MMU 704. The MMU 704 may also include a memory system interface 718 configured to receive/send memory accesses between the MMU 704 and the heterogeneous memory system 106. In the illustrated embodiment, the MMU 704 may be configured to migrate the cold data or data associated with the relaxed QoS guarantee in a way that the CPU interface 716 is not used, or such that the migration is hidden or done without the aid of the CPU 662 or the VM 602. In such an embodiment, the migration need not burden the CPU 662 or the VM 602 with the task of migration. It is understood that the above is merely one illustrative example to which the disclosed subject matter is not limited.

In the illustrated embodiment, if the triggering event is an absence (in whole or part) of accesses to the data for a period of time, data stored upon the DRAM 116 may be migrated or moved to the slower storage medium 126 (as illustrated by the thick arrow). In some embodiments, the new storage medium may be selected based upon a set of relaxed QoS guarantees. In another embodiment, new storage medium may not meet the QoS guarantee but the failure to meet the QoS guarantee may be deemed acceptable. In such an embodiment, by moving the unused or cold data from the desirable DRAM storage 116, more space may be freed up for the storage of hot or frequently used data. Thus, the overall performance of the system 700 may be increased as the QoS guarantee is able to be meet for the more frequently used data (as opposed the case in which the used data must be stored in the less desirable PRAM 126 because the DRAM 116 is out of space). It is understood that the above is merely one illustrative example to which the disclosed subject matter is not limited.

In various embodiments of the above example, if the data stored on the PRAM 126 is then not accessed again for a second threshold period, a second triggering event may occur and a further relaxing of the QoS guarantees may occur for that page or data. In such an embodiment, the data may again be migrated to a third or subsequent storage medium (e.g., storage medium 136 or 146, etc.). It is understood that the above is merely one illustrative example to which the disclosed subject matter is not limited.

In another embodiment, triggering events may cause QoS guarantees to be increased. For example, if the cold data stored in the PRAM 126 is accessed frequently, a new triggering event may occur and the now-hot data may be moved from the PRAM 126 to the DRAM 116 (as illustrated by the thick arrow). It is understood that the above is merely one illustrative example to which the disclosed subject matter is not limited.

In various embodiments, examples of triggering events may include, for example, the time of day (e.g., QoS guarantees may be relaxed during the night, etc.), a level of activity by the VM 602 or application 698, the amount of space in storage medium or system 700, the number of VMs 602 executed by the system 700, a user of the application 698 (e.g., a certain user may pay for a higher QoS, etc.), etc. It is understood that the above are merely a few illustrative examples to which the disclosed subject matter is not limited.

Figure 8:
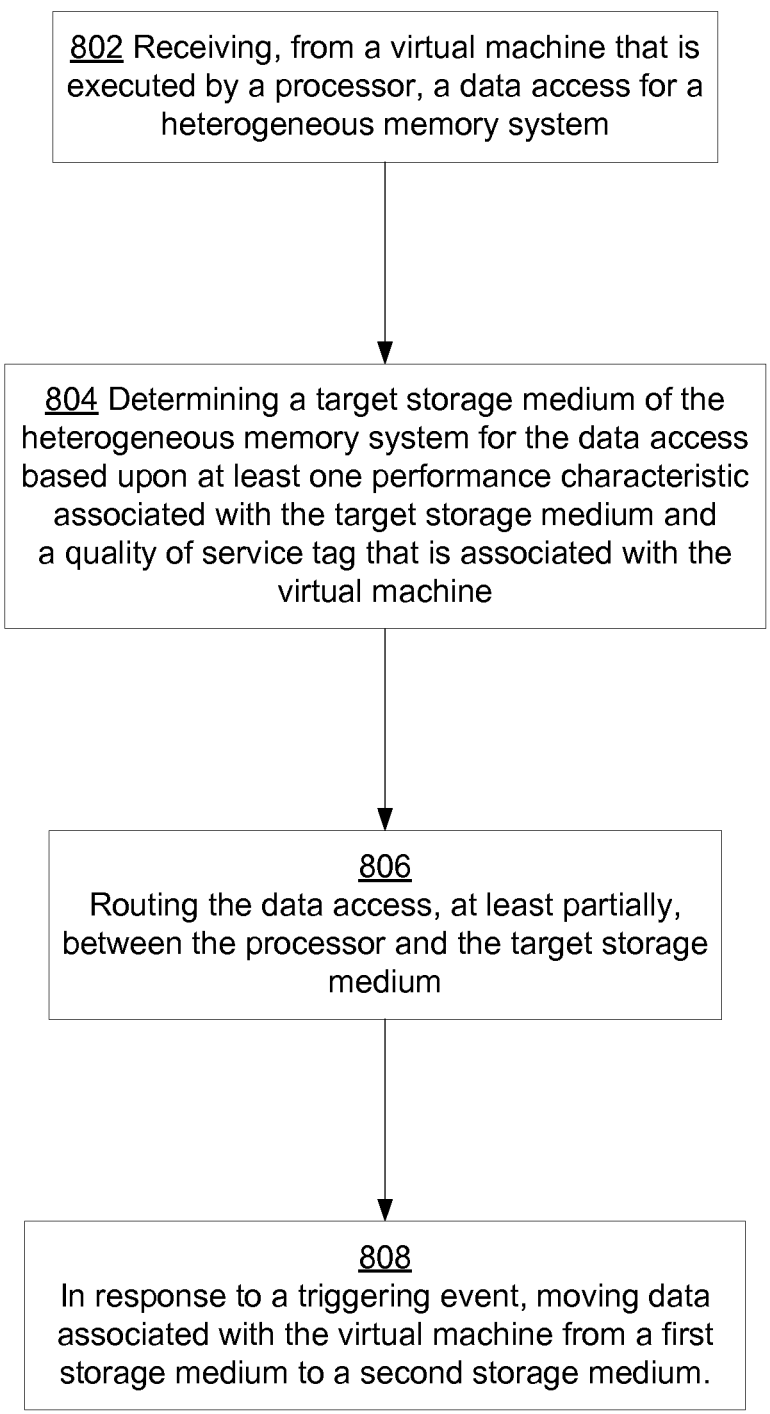
FIG. 8 is a flowchart of an example embodiment of a technique in accordance with the disclosed subject matter.

FIG. 8 is a flow chart of an example embodiment of a technique in accordance with the disclosed subject matter. In various embodiments, the technique 800 may be used or produced by the systems such as those of FIG. 1, 2, 3a, 3b, 3c, or 4. Furthermore, portions of technique 800 may be used or produced by the systems such as that of FIG. 6a, 6b, or 7. Although, it is understood that the above are merely a few illustrative examples to which the disclosed subject matter is not limited. It is understood that the disclosed subject matter is not limited to the ordering of or number of actions illustrated by technique 800.

FIG. 8 is a flow chart of an example embodiment of a technique in accordance with the disclosed subject matter. In various embodiments, the technique 800 may be used or produced by the systems such as those of FIG. 1, 2, 3a, 3b, 3c, 4, 5, 6a, 6b, 7, or 9. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, a data access may be received for a heterogeneous memory system, as described above. In various embodiments, this data access may be received from a virtual machine that is executed by a processor, as described above. In such an embodiment, the heterogeneous memory system may include a plurality of types of storage mediums, wherein each type of storage medium is based upon a respective memory technology and is associated with one or more performance characteristic, as described above.

Block 804 illustrates that, in one embodiment, a target storage medium of the heterogeneous memory system for the data access may be determined, as described above. In some embodiments, determining may be done by a memory management unit, as described above. In various embodiments, determining may be based, at least partially, at least one performance characteristic associated with the target storage medium and a quality of service tag that is associated with the virtual machine and that indicates one or more performance characteristics guaranteed by the virtual machine, as described above.

In various embodiments, the quality of service tag may include at least two portions, as described above. In some embodiments, a first portion of the quality of service tag may indicate a performance characteristic guaranteed by the virtual machine, and a second portion of the quality of service tag may indicate a range of values for the performance characteristic guaranteed by the virtual machine, as described above.

In various embodiments, determining a target storage medium may include maintaining a count of an amount of allocable storage space associated with each storage medium, as described above. In such an embodiment, determining may include selecting a target storage medium based, at least in part, upon the amount of allocable storage space associated with each respective storage medium, and the quality of service tag, as described above.

In some embodiments, the virtual machine may be configured to execute a plurality of applications, as described above. In such an embodiment, each of the applications may be associated with a quality of service tag that indicates one or more performance characteristics guaranteed by the virtual machine, as described above. In one such embodiment, determining a target storage medium may include determining which application executed is associated with the data access, as described above.

Block 806 illustrates that, in one embodiment, routing the data access may be routed between the processor and the target storage medium, as described above. In some embodiments, this may be done by the memory management unit, as described above.

Block 808 illustrates that, in one embodiment, in response to a triggering event, data associated with the virtual machine may be moved from a first storage medium to a second storage medium, as described above. In various embodiments, this may be done by a memory management unit, as described above. In one embodiment, the triggering event may include the data not being accessed within a predefined time period, as described above. In another embodiment, the triggering event may include relaxing one or more of the performance characteristics guaranteed by the virtual machine, as described above.

Figure 9:
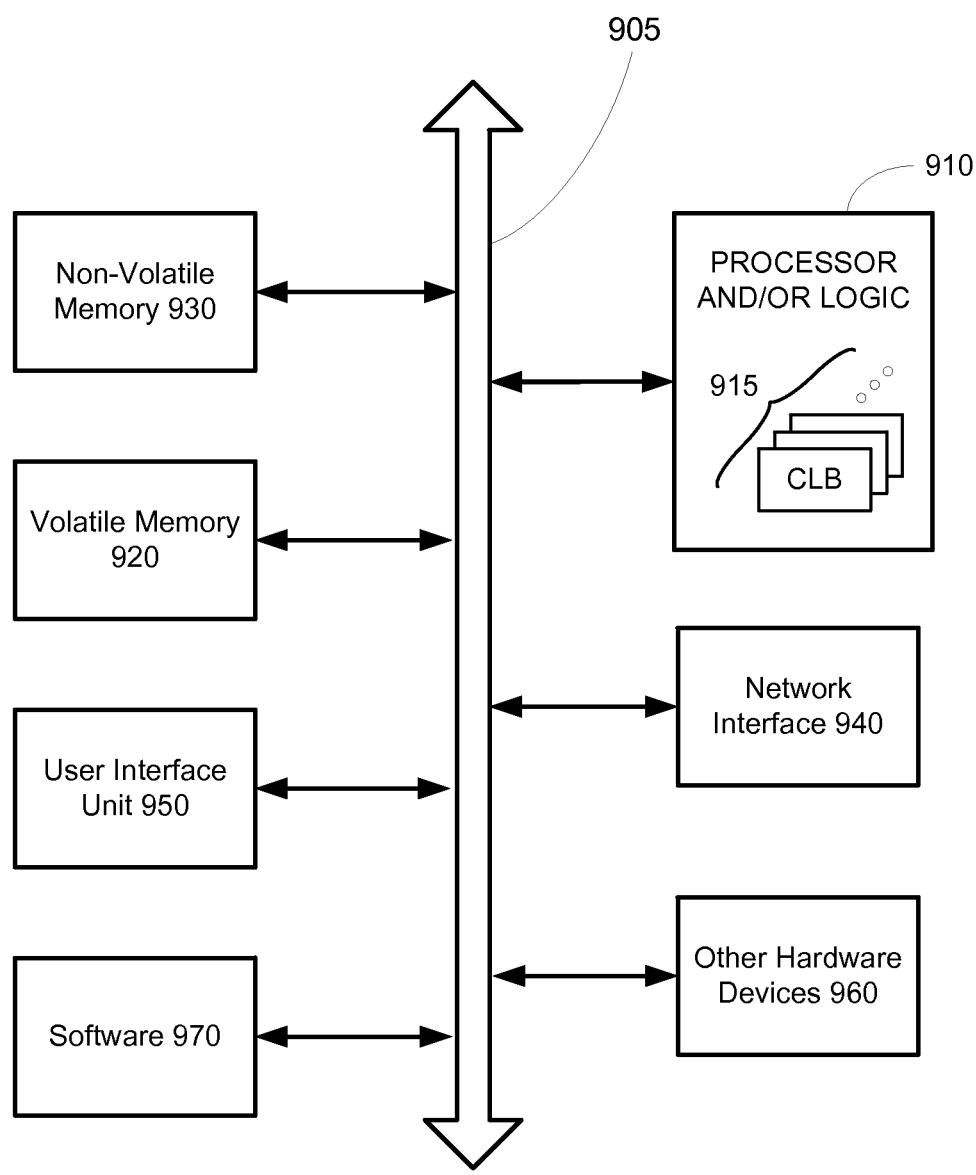
FIG. 9 is a schematic block diagram of an information processing system that may include devices formed according to principles of the disclosed subject matter.

FIG. 9 is a schematic block diagram of an information processing system 900, which may include semiconductor devices formed according to principles of the disclosed subject matter.

Referring to FIG. 9, an information processing system 900 may include one or more of devices constructed according to the principles of the disclosed subject matter. In another embodiment, the information processing system 900 may employ or execute one or more techniques according to the principles of the disclosed subject matter.

In various embodiments, the information processing system 900 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 900 may be used by a user (not shown).

The information processing system 900 according to the disclosed subject matter may further include a central processing unit (CPU), logic, or processor 910. In some embodiments, the processor 910 may include one or more functional unit blocks (FUBs) or combinational logic blocks (CLBs) 915. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 900 according to the disclosed subject matter may further include a volatile memory 920 (e.g., a Random Access Memory (RAM), etc.). The information processing system 900 according to the disclosed subject matter may further include a non-volatile memory 930 (e.g., a hard drive, an optical memory, a NAND or Flash memory, etc.). In some embodiments, either the volatile memory 920, the non-volatile memory 930, or a combination or portions thereof may be referred to as a "storage medium". In various embodiments, the volatile memory 920 and/or the non-volatile memory 930 may be configured to store data in a semi-permanent or substantially permanent form.

In various embodiments, the information processing system 900 may include one or more network interfaces 940 configured to allow the information processing system 900 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 900 according to the disclosed subject matter may further include a user interface unit 950 (e.g., a display adapter, a haptic interface, a human interface device, etc.). In various embodiments, this user interface unit 950 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 900 may include one or more other devices or hardware components 960 (e.g., a display or monitor, a keyboard, a mouse, a camera, a fingerprint reader, a video processor, etc.). It is understood that the above are merely a few illustrative examples to which the disclosed subject matter is not limited.

The information processing system 900 according to the disclosed subject matter may further include one or more system buses 905. In such an embodiment, the system bus 905 may be configured to communicatively couple the processor 910, the volatile memory 920, the non-volatile memory 930, the network interface 940, the user interface unit 950, and one or more hardware components 960. Data processed by the processor 910 or data inputted from outside of the non-volatile memory 930 may be stored in either the non-volatile memory 930 or the volatile memory 920.

In various embodiments, the information processing system 900 may include or execute one or more software components 970. In some embodiments, the software components 970 may include an operating system (OS) and/or an application. In some embodiments, the OS may be configured to provide one or more services to an application and manage or act as an intermediary between the application and the various hardware components (e.g., the processor 910, a network interface 940, etc.) of the information processing system 900. In such an embodiment, the information processing system 900 may include one or more native applications, which may be installed locally (e.g., within the non-volatile memory 930, etc.) and configured to be executed directly by the processor 910 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 910.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SS OP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising: a memory management unit comprising:
    a first memory interface configured to communicate with a heterogeneous memory system that comprises a plurality of types of storage mediums, wherein each type of storage medium is based upon a respective memory technology and is associated with one or more performance characteristics;
    a second memory interface configured to a receive, from a virtual machine, a data access for the heterogeneous memory system; and
    a controller configured to:
        determine a target storage medium from the at least one of the storage mediums of the heterogeneous memory system to service the data access, wherein the target storage medium is selected based, at least in part, upon at least one performance characteristic associated with the target storage medium and a quality of service tag, wherein the quality of service tag is associated with the virtual machine and that indicates one or more desired storage medium performance characteristics that the virtual machine desires to be met as part of a fulfillment of the data access, and
        route the data access by the virtual machine through the memory management unit to the target storage medium;
        wherein the quality of service tag includes at least two portions; wherein a first portion of the quality of service tag indicates a performance characteristic guaranteed by the virtual machine; and wherein a second portion of the quality of service tag indicates a range of values for the performance characteristic guaranteed by the virtual machine.

2. The apparatus of claim 1, wherein the memory management unit is configured to, in response to a triggering event, move data associated with the virtual machine from a first storage medium to a second storage medium.

3. The apparatus of claim 2, wherein the triggering event includes that data not being accessed within a predefined time period.

4. The apparatus of claim 2, wherein the triggering event includes relaxing one or more of the performance characteristics guaranteed by the virtual machine.

5. The apparatus of claim 1, wherein the memory management unit is configured to:
    maintain a count of an amount of allocable storage space associated with each storage medium; and
    route a data access by the virtual machine to at least one of the storage mediums based, at least in part, upon the amount of allocable storage space associated with each respective storage medium, and the quality of service tag.

6. The apparatus of claim 5, wherein the memory management unit is configured to allocate data associated with the virtual machine across two or more of the storage mediums.

7. The apparatus of claim 5, wherein the memory management unit is configured to allocate memory pages of the virtual machine across two or more storage devices, wherein the two or more storage devices share a same, physical address space.

8. The apparatus of claim 1, wherein the virtual machine is configured to execute a plurality of applications; and wherein each of the applications is associated with a quality of service tag that indicates one or more performance characteristics guaranteed by the virtual machine.

9. The apparatus of claim 1, wherein the heterogeneous memory system comprises both volatile and non-volatile storage mediums.

10. The apparatus of claim 1, wherein the memory management unit is included as part of an integrated circuit.

11. The apparatus of claim 1, wherein the memory management unit is included as part of a system-on-a-chip, wherein the system-on-a-chip further includes a processor.

12. The apparatus of claim 1, wherein the memory management unit is configured to operate, at least in part, as both a memory controller hub and an input/output controller hub.

13. The apparatus of claim 1, wherein the memory management unit comprises
   a memory controller configured to dynamically make a determination as to how to route the data access, and
   at least one co-processor configured to support the memory controller in making the determination,
   wherein the memory controller and at least one co-processor are integrated into a single chip.

14. The apparatus of claim 13, wherein the at least one co-processor includes a direct memory access circuit.

15. The apparatus of claim 1, wherein the memory management unit routes the data access via a non-packet-based protocol.

16. The apparatus of claim 1, wherein the memory management unit is configured to:
   receive a data access in a unified, storage medium technology independent format, and
   locally route the data access in a native, storage medium technology dependent format.

17. The apparatus of claim 1, wherein the memory management unit comprises:
   a plurality of memory interfaces configured to communicate with the heterogeneous memory system; and
   a processing-side interface configured to communicate with at least one processor.

18. The apparatus of claim 1, wherein the memory management unit comprises a virtualization layer configured to process the quality of service tag.

19. A method of transmitting data via a memory management unit, the method comprising:
   receiving, from a virtual machine that is executed by a processor, a data access for a heterogeneous memory system,
   wherein the heterogeneous memory system comprises a plurality of types of storage mediums, wherein each type of storage medium is based upon a respective memory technology and is associated with one or more performance characteristic;
   determining, by the memory management unit, a target storage medium of the heterogeneous memory system for the data access based, at least in part, upon at least one performance characteristic associated with the target storage medium and a quality of service tag that is associated with the virtual machine and that indicates one or more desired storage medium performance characteristics that the virtual machine desires to be met as part of a fulfillment of the data access; and
   routing, by and through the memory management unit, the data access, at least partially, between the processor and the target storage medium;
   wherein the quality of service tag includes at least two portions; wherein a first portion of the quality of service tag indicates a performance characteristic guaranteed by the virtual machine; and wherein a second portion of the quality of service tag indicates a range of values for the performance characteristic guaranteed by the virtual machine.

20. The method of claim 19, further comprising, in response to a triggering event, moving data associated with the virtual machine from a first storage medium to a second storage medium.

21. The method of claim 20, wherein the triggering event includes the data not being accessed within a predefined time period.

22. The method of claim 20, wherein the triggering event includes relaxing one or more of the performance characteristics guaranteed by the virtual machine.

23. The method of claim 19, wherein the quality of service tag includes at least two portions;
   wherein a first portion of the quality of service tag indicates a performance characteristic guaranteed by the virtual machine; and
   wherein a second portion of the quality of service tag indicates a range of values for the performance characteristic guaranteed by the virtual machine.

24. The method of claim 19, wherein determining a target storage medium comprises:
   maintaining a count of an amount of allocable storage space associated with each storage medium; and
   selecting a target storage medium based, at least in part, upon the amount of allocable storage space associated with each respective storage medium, and the quality of service tag.

25. The method of claim 19, wherein the virtual machine is configured to execute a plurality of applications, wherein each of the applications is associated with a quality of service tag that indicates one or more performance characteristics guaranteed by the virtual machine; and
   wherein determining a target storage medium comprises determining which application executed is associated with the data access.

26. An apparatus comprising:
   a processing-side interface configured to receive a data access of a memory system; a memory router configured to: determine if the memory access targets a heterogeneous memory system that comprises a plurality of types of storage mediums, wherein each type of storage medium is based upon a respective memory technology and is associated with one or more performance characteristic, and
   if the memory access targets a heterogeneous memory system, select a target storage medium of the heterogeneous memory system for the data access based, at least in part, upon at least one storage medium performance characteristic that is associated with the target storage medium and a quality of service tag that is associated with the data access and that indicates one or more storage medium performance characteristics that a virtual machine desires to be met as part of a fulfillment of the data access; and
   a heterogeneous memory system interface configured to, if the memory access targets a heterogeneous memory system, route the data access, at least partially, to the target storage medium;
   wherein the quality of service tag includes at least two portions; wherein a first portion of the quality of service tag indicates a performance characteristic guaranteed by the virtual machine; and wherein a second portion of the quality of service tag indicates a range of values for the performance characteristic guaranteed by the virtual machine.

27. The apparatus of claim 26, wherein the memory router is configured to, in response to a triggering event, move data associated with the virtual machine from a first storage medium to a second storage medium.

28. The apparatus of claim 26, wherein the memory router is configured to:
- maintain a count of an amount of allocable storage space associated with each storage medium; and
- select a target storage medium based, at least in part, upon the amount of allocable storage space associated with each respective storage medium, and the quality of service tag,
- such that when a preferred storage medium falls below a threshold level of allocable storage space, a less preferred storage medium is selected as the target storage medium.

29. An apparatus comprising:
- a processing-side interface configured to receive a data access of a memory system;
- a memory router configured to:
    - maintain a count of an amount of allocable storage space associated with each storage medium,
    - determine if the memory access targets a heterogeneous memory system that comprises a plurality of types of storage mediums, wherein each type of storage medium is based upon a respective memory technology and is associated with one or more performance characteristic, and
    - if the memory access targets a heterogeneous memory system, select a target storage medium of the heterogeneous memory system for the data access based, at least in part, upon the amount of allocable storage space associated with each respective storage medium and at least one storage medium performance characteristic that is associated with the target storage medium and a quality of service tag that is associated with the data access and that indicates one or more storage medium performance characteristics that a virtual machine desires to be met as part of a fulfillment of the data access; and
- a heterogeneous memory system interface configured to, if the memory access targets a heterogeneous memory system, route the data access, at least partially, to the target storage medium;
- wherein the quality of service tag includes at least two portions; wherein a first portion of the quality of service tag indicates a performance characteristic guaranteed by the virtual machine; and wherein a second portion of the quality of service tag indicates a range of values for the performance characteristic guaranteed by the virtual machine.

* * * * *